(12) United States Patent
Barroso

(10) Patent No.: US 8,424,044 B2
(45) Date of Patent: Apr. 16, 2013

(54) METHOD AND SYSTEM FOR MONITORING AND SWITCHING BETWEEN A PRIMARY ENCODER AND A BACK-UP ENCODER IN A COMMUNICATION SYSTEM

(75) Inventor: Eduardo Barroso, Rowland Heights, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1535 days.

(21) Appl. No.: 11/853,747

(22) Filed: Sep. 11, 2007

(65) Prior Publication Data

US 2009/0067490 A1 Mar. 12, 2009

(51) Int. Cl.
H04N 7/20 (2006.01)

(52) U.S. Cl.
USPC .............................................. 725/63; 725/67

(58) Field of Classification Search .................. 725/63, 725/67
See application file for complete search history.

(56) References Cited

U.S. PATENT DOCUMENTS

| | | |
|---|---|---|
| 4,317,010 A | 2/1982 | Fillot |
| 4,882,743 A | 11/1989 | Mahmoud |
| 5,189,516 A | 2/1993 | Angell et al. |
| 5,257,106 A | 10/1993 | Maruoka |
| 5,424,770 A | 6/1995 | Schmelzer et al. |
| 5,499,046 A | 3/1996 | Schiller et al. |
| 5,566,353 A | 10/1996 | Cho et al. |
| 5,600,573 A | 2/1997 | Hendricks et al. |
| 5,659,350 A | 8/1997 | Hendricks et al. |
| 5,684,714 A | 11/1997 | Yogeshwar et al. |
| 5,852,721 A | 12/1998 | Dillon et al. |
| 5,933,123 A | 8/1999 | Kaul |
| 5,995,495 A | 11/1999 | Sampson |
| 6,047,162 A | 4/2000 | Lazaris-Brunner et al. |
| 6,246,873 B1 | 6/2001 | Flowers et al. |
| 6,266,329 B1 | 7/2001 | Lazaris-Brunner et al. |
| 6,308,286 B1 | 10/2001 | Richmond et al. |
| 6,311,128 B1 | 10/2001 | Prum et al. |
| 6,333,922 B1 | 12/2001 | Campanella |
| 6,496,205 B1 | 12/2002 | White et al. |
| 6,498,922 B1 | 12/2002 | Lazaris-Brunner et al. |
| 6,529,146 B1 | 3/2003 | Kowalski et al. |
| 6,557,031 B1 | 4/2003 | Mimura et al. |

(Continued)

FOREIGN PATENT DOCUMENTS

WO 03/058967 A1 7/2003

OTHER PUBLICATIONS

Non-final Office action dated Dec. 22, 2010 in U.S. Appl. No. 11/853,765, filed Sep. 11, 2007 by Eduardo Barroso.

(Continued)

*Primary Examiner* — Brian Pendleton
*Assistant Examiner* — Olugbenga Idowu

(57) ABSTRACT

A system and method for switching to a back-up encoder includes a first encoder processing a first channel signal to form a first encoded signal, a second encoder an uplink signal processing system generating a first uplink signal from the first encoded signal. A monitoring system previews the first channel signal encoded through the second encoder while the uplink signal processing system generates the first broadcast signal using the first channel signal encoded through the first encoder. The monitoring system redirects the first channel signal through the second encoder to form a second encoded signal. The uplink signal processing system generates a second broadcast signal with the first channel signal through the second encoder.

25 Claims, 27 Drawing Sheets

U.S. PATENT DOCUMENTS

| | | | |
|---|---|---|---|
| 6,587,687 B1 | 7/2003 | Wiedeman | |
| 6,654,923 B1 | 11/2003 | Grenier et al. | |
| 6,782,550 B1 | 8/2004 | Cao | |
| 6,795,506 B1 | 9/2004 | Zhang et al. | |
| 6,873,877 B1 | 3/2005 | Tobias et al. | |
| 6,965,755 B1 | 11/2005 | Barrett | |
| 7,039,116 B1 | 5/2006 | Zhang et al. | |
| 7,068,975 B2 | 6/2006 | Loner | |
| 7,174,562 B1 | 2/2007 | Leak et al. | |
| 7,209,636 B2* | 4/2007 | Imahashi et al. | 386/278 |
| 7,315,887 B1 | 1/2008 | Liang et al. | |
| 7,333,425 B2 | 2/2008 | Huck et al. | |
| 7,373,650 B1 | 5/2008 | Rodriguez et al. | |
| 7,380,264 B2 | 5/2008 | Potrebic | |
| 7,529,276 B1 | 5/2009 | Ramakrishnan | |
| 7,580,612 B2* | 8/2009 | Sato et al. | 386/270 |
| 7,584,297 B1 | 9/2009 | Wilcoxson | |
| 7,602,846 B1 | 10/2009 | Wu et al. | |
| 7,650,620 B2 | 1/2010 | Fish et al. | |
| 7,746,791 B2 | 6/2010 | Wimmer | |
| 8,139,517 B2 | 3/2012 | Oger et al. | |
| 2001/0003846 A1 | 6/2001 | Rowe et al. | |
| 2001/0036198 A1 | 11/2001 | Arsenault et al. | |
| 2002/0007494 A1 | 1/2002 | Hodge | |
| 2002/0023165 A1* | 2/2002 | Lahr | 709/231 |
| 2002/0053049 A1 | 5/2002 | Shiomoto et al. | |
| 2002/0150061 A1 | 10/2002 | Arsenault | |
| 2002/0166128 A1 | 11/2002 | Ikeda et al. | |
| 2002/0186320 A1 | 12/2002 | Carlsgaard et al. | |
| 2002/0194596 A1 | 12/2002 | Srivastava | |
| 2003/0007564 A1 | 1/2003 | Jeong | |
| 2003/0018975 A1 | 1/2003 | Stone | |
| 2003/0022625 A1 | 1/2003 | Otten et al. | |
| 2003/0028897 A1 | 2/2003 | Brooks | |
| 2003/0095554 A1 | 5/2003 | Shimizu | |
| 2003/0109220 A1 | 6/2003 | Hadinger et al. | |
| 2003/0140353 A1 | 7/2003 | Hugenberg et al. | |
| 2003/0217362 A1 | 11/2003 | Summers et al. | |
| 2004/0001478 A1 | 1/2004 | Wong | |
| 2004/0022275 A1 | 2/2004 | Blanchard | |
| 2004/0078807 A1 | 4/2004 | Fries et al. | |
| 2004/0117831 A1 | 6/2004 | Ellis et al. | |
| 2004/0141530 A1 | 7/2004 | Spio | |
| 2004/0181813 A1 | 9/2004 | Ota et al. | |
| 2004/0216171 A1 | 10/2004 | Barone et al. | |
| 2004/0234145 A1 | 11/2004 | Yatabe et al. | |
| 2004/0255333 A1 | 12/2004 | Kenworthy | |
| 2005/0076134 A1 | 4/2005 | Bialik et al. | |
| 2005/0086696 A1 | 4/2005 | Daniels | |
| 2005/0099969 A1 | 5/2005 | Roberts et al. | |
| 2005/0155079 A1 | 7/2005 | Chen et al. | |
| 2005/0160477 A1 | 7/2005 | Saito | |
| 2005/0210123 A1 | 9/2005 | Wang et al. | |
| 2005/0210133 A1 | 9/2005 | Florissi et al. | |
| 2005/0240967 A1 | 10/2005 | Anderson et al. | |
| 2006/0018254 A1* | 1/2006 | Sanders et al. | 370/216 |
| 2006/0035610 A1 | 2/2006 | Potrebic | |
| 2006/0050184 A1 | 3/2006 | McMiller et al. | |
| 2006/0083315 A1* | 4/2006 | Sato et al. | 375/240.25 |
| 2006/0123455 A1 | 6/2006 | Pai et al. | |
| 2006/0166699 A1 | 7/2006 | Aghvami et al. | |
| 2006/0198389 A1 | 9/2006 | Eriokson et al. | |
| 2006/0242674 A1 | 10/2006 | Medford et al. | |
| 2007/0022438 A1 | 1/2007 | Arseneau et al. | |
| 2007/0040933 A1 | 2/2007 | Seong | |
| 2007/0047542 A1 | 3/2007 | Thukral | |
| 2007/0053379 A1 | 3/2007 | Hershey et al. | |
| 2007/0079351 A1 | 4/2007 | Wang et al. | |
| 2007/0094691 A1 | 4/2007 | Gazdzinski | |
| 2007/0118861 A1 | 5/2007 | Stone | |
| 2007/0157281 A1 | 7/2007 | Ellis et al. | |
| 2007/0263627 A1 | 11/2007 | Karino et al. | |
| 2008/0043663 A1 | 2/2008 | Youssefzadeh et al. | |
| 2008/0066096 A1 | 3/2008 | Wollmershauser et al. | |
| 2008/0101455 A1 | 5/2008 | Scheelke | |
| 2008/0102750 A1 | 5/2008 | Keener et al. | |
| 2008/0137543 A1 | 6/2008 | Mitra | |
| 2008/0291907 A1 | 11/2008 | Rogasch | |
| 2009/0022241 A1 | 1/2009 | Fukuoka et al. | |
| 2009/0025027 A1 | 1/2009 | Craner | |
| 2009/0254962 A1 | 10/2009 | Hendricks et al. | |
| 2010/0208595 A1 | 8/2010 | Zhao et al. | |

OTHER PUBLICATIONS

Final Rejection dated Jun. 7, 2011 in U.S. Appl. No. 11/853,765, filed Sep. 11, 2007 by Eduardo Barroso.

Non-final Office action dated Dec. 5, 2011 in U.S. Appl. No. 11/853,765, filed Sep. 11, 2007 by Eduardo Barroso.

Final Rejection dated Jun. 25, 2012 in U.S. Appl. No. 11/853,765, filed Sep. 11, 2007 by Eduardo Barroso.

* cited by examiner

METHOD AND SYSTEM FOR MONITORING AND SWITCHING BETWEEN A PRIMARY ENCODER AND A BACK-UP ENCODER IN A COMMUNICATION SYSTEM

TECHNICAL FIELD

The present disclosure relates generally to communication systems, and more particularly to a method and apparatus for forming and monitoring output signals such as uplink signals in a satellite communication system.

BACKGROUND

The statements in this section merely provide background information related to the present disclosure and may not constitute prior art.

Satellite broadcasting of television signals has increased in popularity. Satellite television providers continually offer more and unique services to their subscribers to enhance the viewing experience. Providing reliability in a satellite broadcasting system is therefore an important goal of satellite broadcast providers. Providing reliable signals reduces the overall cost of the system by reducing the number of received calls at a customer call center.

High definition television offerings by major networks are continually increasing. Providing increasing high definition television programming to satellite television subscribers is desirable. However, this must be performed in a reliable manner.

SUMMARY

The present disclosure provides a means for monitoring and controlling signals in an uplink processing system.

In one aspect of the invention, a method includes processing a first channel signal with a first encoder, selecting a second encoder, previewing the first channel signal encoded through the second encoder while generating a first broadcast signal using the first channel signal encoded through the first encoder, redirecting the first channel signal through the second encoder to form a second encoded signal and generating a second broadcast signal with the first channel signal through the second encoder.

In a further aspect of the invention, a method includes processing a first channel signal with a first encoder, said channel signal having a channel service profile, selecting a second encoder, copying the channel service profile to a monitoring service profile of a monitoring system, previewing the first channel signal through the second encoder to form a second encoded signal while generating a first broadcast signal using the first channel signal through the first encoder, redirecting the first channel signal through the second encoder and generating a second broadcast signal with the first channel signal through the first encoder.

In a further aspect of the invention, a system includes a first encoder processing a first channel signal to form a first encoded signal, a second encoder an uplink signal processing system generating a first uplink signal from the first encoded signal. A monitoring system previews the first channel signal encoded through the second encoder while the uplink signal processing system generates the first broadcast signal using the first channel signal encoded through the first encoder. The monitoring system redirects the first channel signal through the second encoder to form a second encoded signal. The uplink signal processing system generates a second broadcast signal with the first channel signal through the second encoder.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
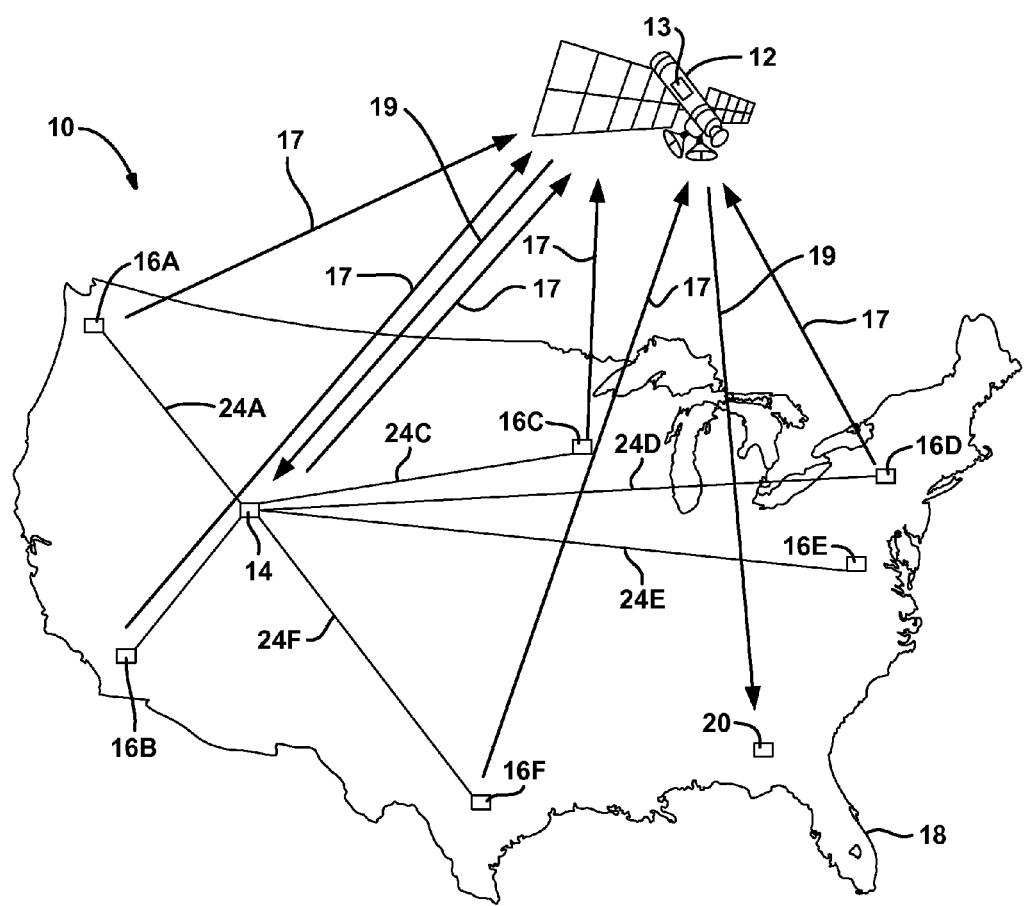
FIG. 1 is an overall system view of a satellite communication system in the continental United States.

The following description is merely exemplary in nature and is not intended to limit the present disclosure, application, or uses. It should be understood that throughout the drawings, corresponding reference numerals indicate like or corresponding parts and features.

As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is described with respect to a satellite television system. However, the present disclosure may have various uses including satellite transmission and data transmission and reception for home or business uses. The system may also be used in a cable system or wireless terrestrial communication system for generating an output signal.

Referring now to FIG. 1, a communication system 10 includes a satellite 12 that includes at least one transponder 13. Typically, multiple transponders are in a satellite. The communication system 10 includes a central facility 14 and a plurality of regional facilities 16A, 16B, 16C, 16D, 16E and 16F. Although only one satellite is shown, more than one is possible. The regional facilities 16A-16F may be located at various locations throughout a landmass 18 such as the continental United States, including more or less than those illustrated. The regional facilities 16A-16F uplink various uplink signals 17 to satellite 12. The satellites downlink downlink signals 19 to various users 20 that may be located in different areas of the landmass 18. The users 20 may be mobile or fixed users. The uplink signals 17 may be digital signals such as digital television signals or digital data signals. The digital television signals may be high definition television signals. Uplinking may be performed at various frequencies including Ka band. The present disclosure, however, is not limited to Ka band. However, Ka band is a suitable frequency example used throughout this disclosure. The central facility 14 may also receive downlink signals 19 corresponding to the uplink signals 17 from the various regional facilities and from itself for monitoring purposes. The central facility 14 may monitor the quality of all the signals broadcast from the system 10.

The central facility 14 may also be coupled to the regional facilities through a network such as a computer network having associated communication lines 24A-24F. Each communication line 24A-F is associated with a respective regional site 16. Communication lines 24A-24F are terrestrial-based lines. As will be further described below, all of the functions performed at the regional facilities may be controlled centrally at the central facility 14 as long as the associated communication line 24A-F is not interrupted. When a communication line 24A-F is interrupted, each regional site 16A-F may operate autonomously so that uplink signals may continually be provided to the satellite 12. Each of the regional and central facilities includes a transmitting and receiving antenna which is not shown for simplicity in FIG. 1.

Figure 2:
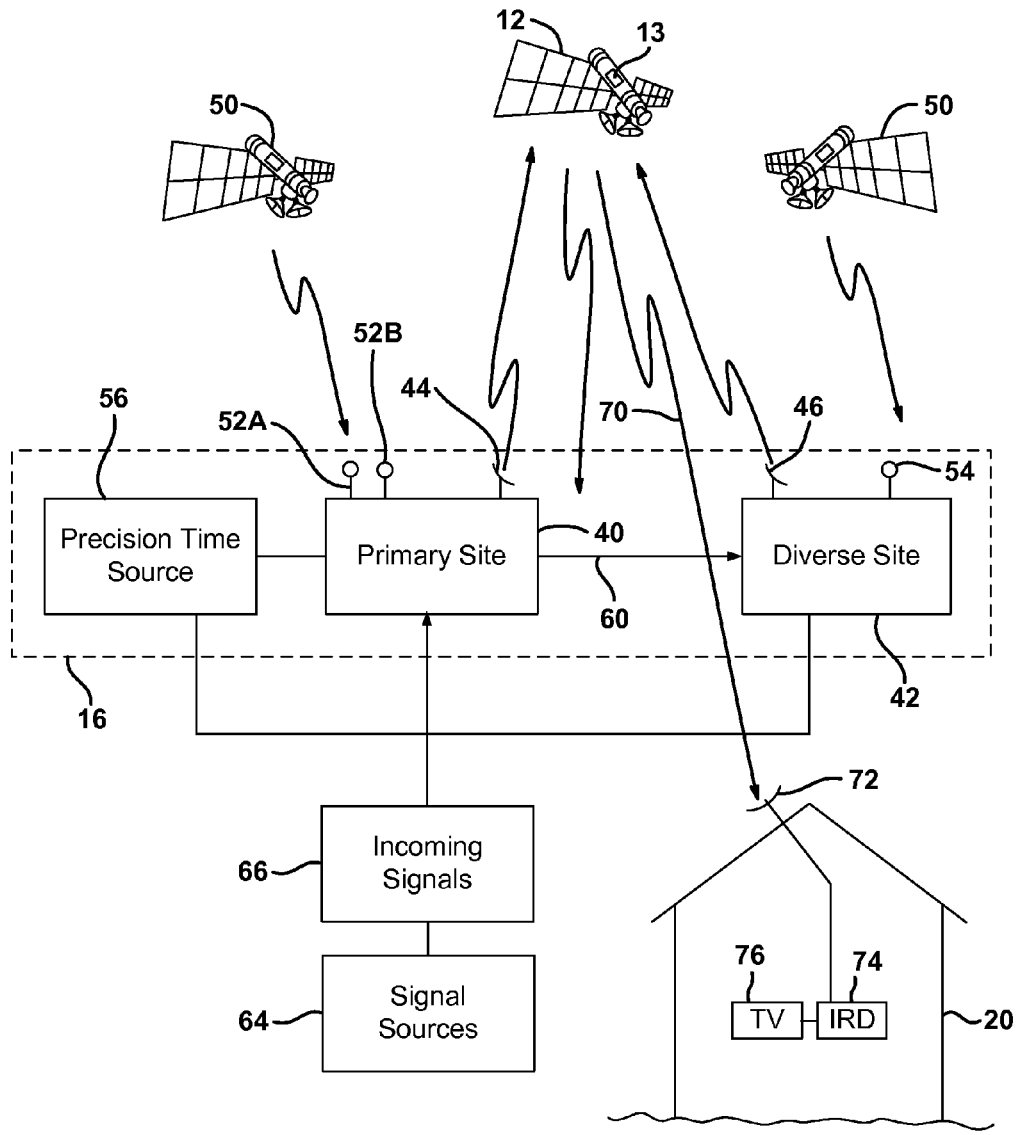
FIG. 2 is a system view at the regional level of a satellite system.
Figure 2:
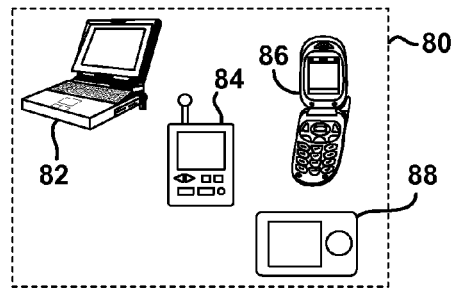

Referring now to FIG. 2, the regional facilities 16A-16F of FIG. 1 are illustrated collectively as reference numeral 16.

The regional facilities 16 may actually comprise two facilities that include a primary site 40 and a diverse site 42. The primary site 40 may be referred to as a primary broadcast center (PBC). As will be described below, the central site 14 may also include a primary site and diverse site as is set forth herein. The primary site 40 and diverse site 42 of both the central and regional sites may be separated by at least 25 miles, or, more even more such as, at least 40 miles. In one constructed embodiment, 50 miles was used. The primary site 40 includes a first antenna 44 for transmitting and receiving signals to and from satellite 12. Diverse site 42 also includes an antenna 46 for transmitting and receiving signals from satellite 12.

Primary site 40 and diverse site 42 may also receive signals from GPS satellites 50. GPS satellites 50 generate signals corresponding to the location and a precision timed signal that may be provided to the primary site 40 through an antenna 52 and to the diverse site 42 through an antenna 54. It should be noted that redundant GPS antennas (52A,B) for each site may be provided. In some configurations, antennas 44 and 46 may also be used to receive GPS signals.

A precision time source 56 may also be coupled to the primary site 40 and to the diverse site 42 for providing a precision time source. The precision time source 56 may include various sources such as coupling to a central atomic clock. The precision time source may be used to trigger certain events such as advertising insertions and the like.

The primary site 40 and the diverse site 42 may be coupled through a communication line 60. Communication line 60 may be a dedicated communication line. The primary site 40 and the diverse site 42 may communicate over the communication line using a video over internet protocol (IP).

Various signal sources 64 such as an optical fiber line, copper line or satellites may provide incoming signals 66 from the primary site 40 to the diverse site 42. Incoming signal 66, as mentioned above, may be television signals. The television signals may be high-definition signals. The incoming signals 66 such as the television signal may be routed from the primary site 40 through the communication line 60 to the diverse site 42 in the event of a switchover whether the switchover is manual or a weather-related automatic switchover. A manual switchover, for example, may be used during a maintenance condition.

In a terrestrial system, the satellites may be eliminated, used or replaced by transmission towers that use terrestrial antennas in place of antennas 46. In a cable system, the antennas 46 may be replaced with optical fibers or copper wires.

Users 20 receive downlink signals 70 corresponding to the television signals. Users 20 may include home-based systems or business-based systems. As illustrated, a user 20 has a receiving antenna 72 coupled to an integrated receiver decoder (IRD) 74 that processes the signals and generates audio and video signals corresponding to the received downlink signal 70 for display on the television or monitor 76. It should also be noted that satellite radio receiving systems may also be used in place of the IRD 74. The integrated receiver decoder may be incorporated into or may be referred to as a set top box.

The user 20 may also be a mobile user. The user 20 may therefore be implemented in a mobile device or portable device. The portable device 80 may include but are not limited to various types of devices such as a laptop computer 82, a personal digital assistant 84, a cellular telephone 86 or a portable media player 88.

Figure 3A:
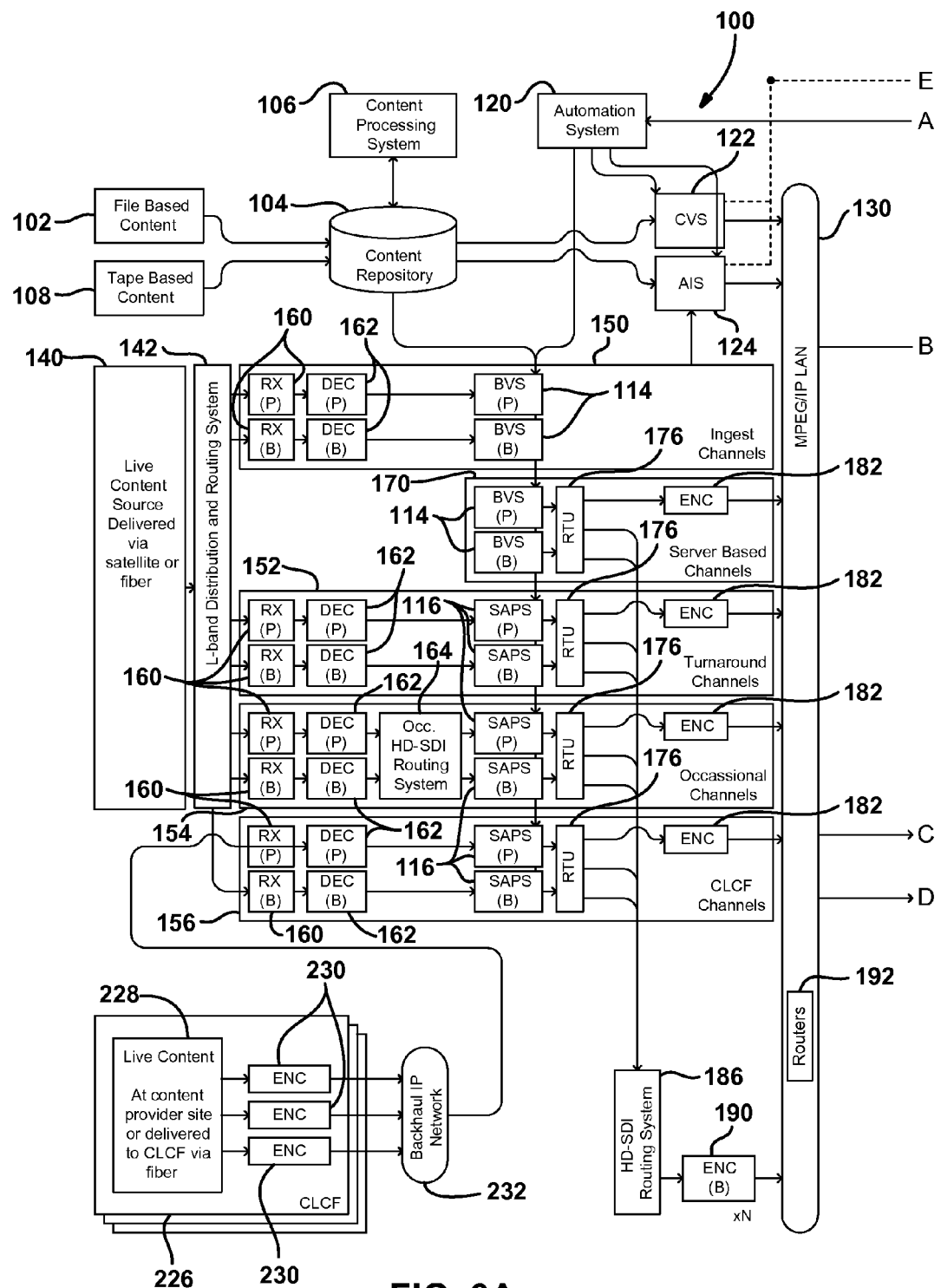
FIGS. 3A and 3B are a block schematic view of the system illustrated in FIGS. 1 and 2.
Figure 3B:
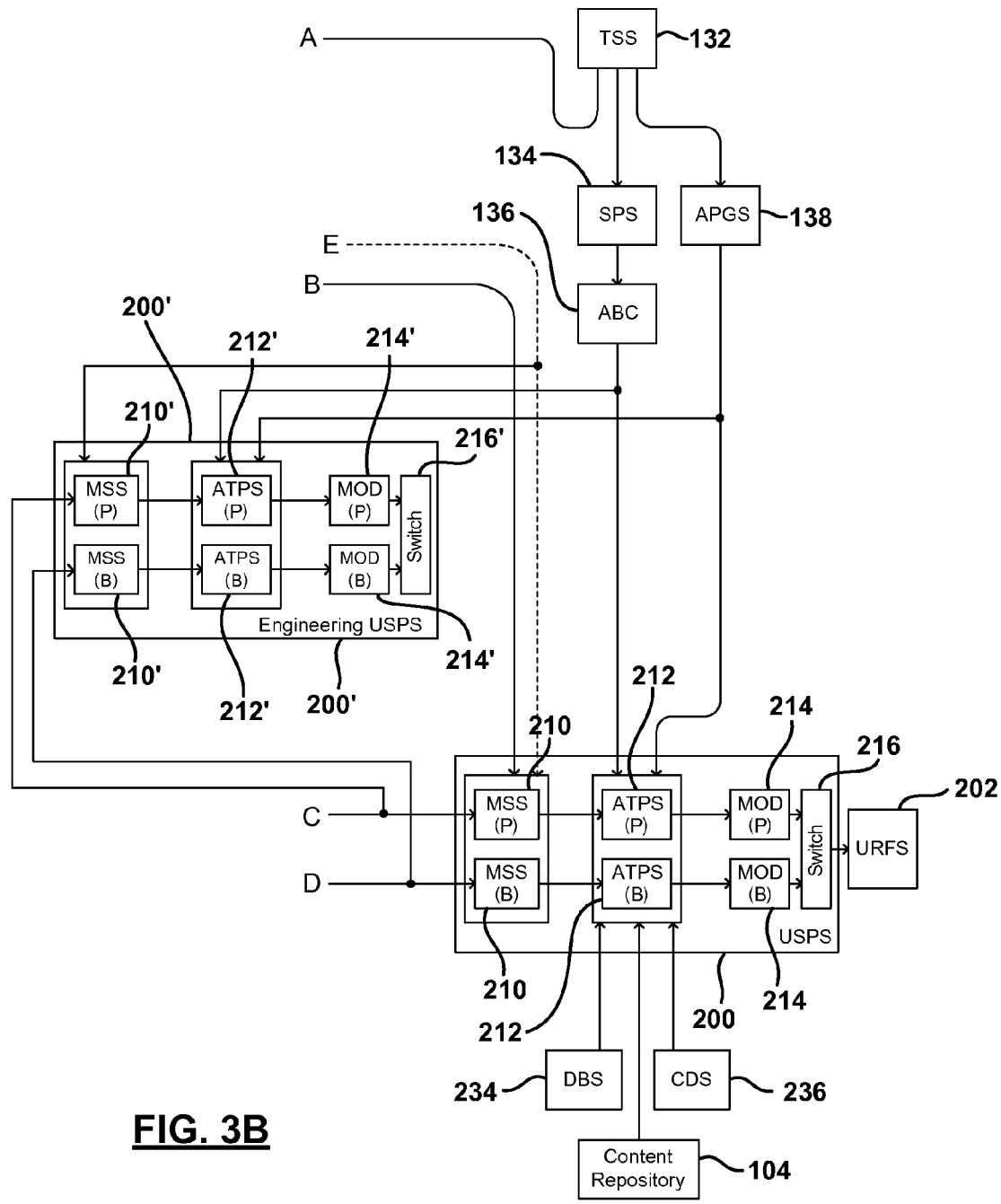

Referring now to FIGS. 3A and 3B, a ground segment system 100 for processing content and forming an output signal is illustrated. One method for providing content is using file-based content 102. The file-based content 102 may be in various standard formats such as CableLabs® content, digital video disks or the like. The file-based content 102 is provided to a content repository 104 that stores the various file-based content. If needed, a content processing system 106 processes the content and converts the format of the file-based content. The content processing system 106 may convert the video compression format, the resolution, the audio compression format and audio bit rates to match the target broadcast path. The content from the content repository 104 may be provided to various systems as will be described below. The content repository 104 may also receive tape-based content 108. The tape-based content 108 may be processed in the content processing system 106 into various formats including a first format such as high-definition, serial digital interface (HD-SDI) format. The content repository 104 may provide content to baseband video servers 114. The (P) and the (B) in the Figure denote a primary and secondary or back-up baseband video server. The content repository 104 may also provide signals to various service access processing systems 116. As illustrated, several service access processing systems (SAPS) are illustrated. Both primary and back-up service access processing systems 116 may be provided in the various chains.

An automation system 120 may control the insertion of various advertising into file-based and live streams. The SAPS 116 may function as an advertising insertion module. The SAPS 116 may also include a digital video effects insertion module described below. The function of the automation system 120 will be further described below.

Content repository 104 may also be coupled to a compressed video server (CVS) 122 and an advertising-insertion server (AIS) 124. The compressed video server 122 uses content that is retrieved from the content repository 104. The content repository 104 stores the content well in advance of use by the compressed video server 122. Likewise, advertising may be also drawn from the content repository 104. Both the content video server 122 and ad-insertion server 124 provide content in a compressed manner. This is in contrast to the baseband video server 114 that is provided content in a baseband. The output of the content video server may be in an IP transport stream. The content output of the compressed video server 122 and the ad-insertion server 124 may be provided to a local area network 130.

Figure 5:
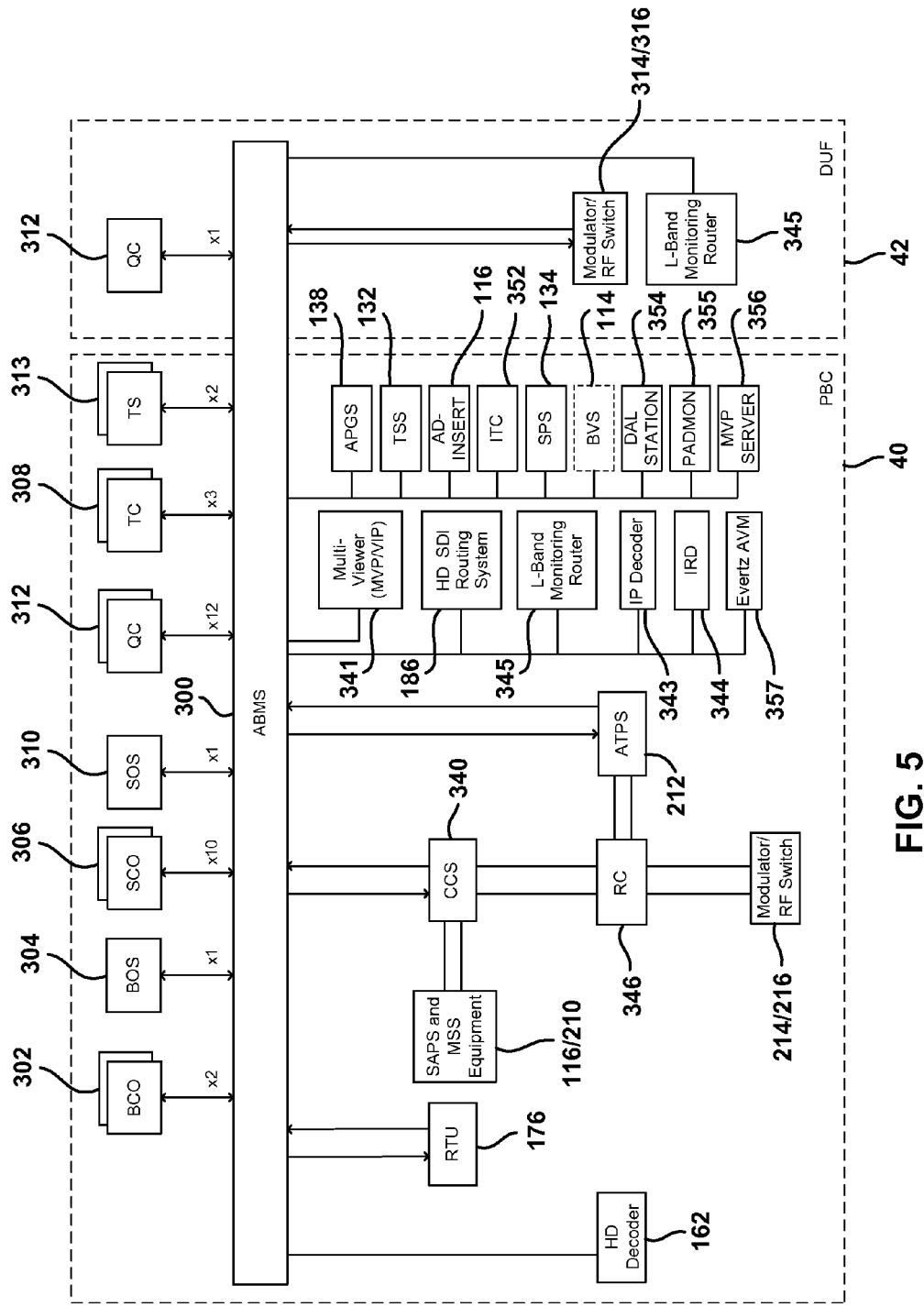
FIG. 5 is a block diagrammatic view of the control portion of the system of FIG. 3.

A traffic scheduling system (TSS) 132 schedules the content throughout the ground segment 100. The traffic scheduling system 132 generates broadcast schedules utilized by the baseband video servers 114, the service access processing system 116, the automation system 120, the compressed video server 122 and the ad-insertion server 124. The traffic and scheduling system 132 provides program-associated data (PAD) to a scheduled PAD server (SPS) 134. The SPS 134 delivers the program-associated data to an advanced broadcast controller (ABC) 136. As will be described below, an advanced broadcast management system (ABMS) 500 illustrated in FIG. 5 is used to monitor and control the content.

The traffic and scheduling system 132 may also be in communication with an advanced program guide system 138.

A live content source 40 delivered by way of a satellite optical fiber or copper wires couple live content to an L-band distribution and routing system 142. Of course, those skilled in the art will recognize various other frequencies may be used for the L-band. The output of the routing system 42 may be provided to ingest channels 150, turnaround channels 152, occasional channels 154, and continental United States local collection facility channels 156. Each of the various channels 150-156 may represent a number of channels. Each of the channels has primary and secondary or back-up circuitry for processing the data stream.

The output of the L-band distribution and routing system 142 provide signals to receivers 160. As mentioned above, the paths may be in primary or secondary paths. The receivers 160 receive the feed signal from the L-band distribution and routing system 142 and demodulate the feed signal. The receiver may also provide decryption. The feed signal may be in an ATSC-compliant transport stream from terrestrial fiber or satellite sources. The feed signal may also be a DVD-compliant transport stream delivered via satellite or fiber. The signal may also include a digicipher-compliant transport stream, a JPEG 2000 transport stream or various proprietary formats from various content providers. The output of the receiver may be provided via an asynchronous serial interface (ASI) or MPEG IP interface.

Should the content from the content provider be provided in a format that can be immediately used by the system, the receiver may be replaced with a pass-through connector such as a barrel connector.

The receive signal from the receiver 160 is provided to decoders 162. The decoders 162 decode the receive signal to provide decoded signals. The receive signal may still be compressed and, thus, the decoder may be used for decoding the live compressed video and audio content. The receive signal may be an ATSC-compliant transport stream, a DVD-compliant transport stream, a digicipher-compliant transport stream, a JPEG 2000 transport stream or various proprietary formats that may be delivered via ASI or MPEG/IP such as MPEG2. The output of the decoder is a baseband signal that may be in a variety of formats such as a high definition serial digital interface (HD-SDI) format. The decoders 162 may also include a general purpose interface used to convey add trigger events via contact closures. The input may be delivered directly from an upstream receiver, a conversion box that converts dual-tone multi-frequency tones from the upstream receiver into the general purpose interface. The audio format may carry various types of audio streams including Dolby digital, Dolby E or PCM audio. More than one type of audio stream may be included for a signal. The house signal may also include Society of Cable Telecommunication Engineers (SCTE) standard 104 and 35 messages. The house signal may also include closed captioning and vertical interval time code (VITC). It is possible that the decoder may not be required if the content provided from the live content sources is in the proper format. Therefore, the decoder is an optional piece of equipment.

For the occasional channels 154, the output of the decoders 162 may be provided to an occasional HD-SDI routing system 164. Of course, the output of the receiver 152 may be routed rather than the output of the decoder 152. An occasional channel is a live turnaround channel that only exists long enough to carry one or more events, typically sporting events such as those in the NFL or NBA. The type of receiver formatting or authorizations may vary depending on the type of event. Only a small number of receivers are used for these types of events. The routing system 164 allows a proper allocation of downstream equipment in proportion to the number of active broadcast channels rather than the number of content providers.

The output of the decoders 162 in the ingest channels 150, the turnaround channels 152, and the CONUS local collection facility channels 156 are each provided to the SAPS 116. The SAPS 116 provide baseband processing which may include conversion to a house format and ad-insertion. The SAPS 116 receives a single HD-SDI signal from each decoder 162. It is possible that the decoder and the SAPS may be combined in one unit. The service access processing system SAPS 116 may extract and reinsert various audio streams, such as PCM, Dolby digital, or Dolby E audio. The SAPS 116 may also transcode the signals in the case where a different coding scheme is required. Various operational modes may also be incorporated into the SAPS 116 including frame synchronization, error concealment, and the use of variable incoming bit rates. The SAPS 116 may also support real time changes in the video format. The video format may, for example, be 1080p, 1080i, 720p, and 480p.

Server-based channels 170 may also be included in the system. Server-based channels 170 include a baseband video server 114 that receives content from the content repository 104.

The primary and back-up baseband video servers 114 of the server-based channels 170 may be coupled to a receiver transfer unit (RTU) 176 which acts as a switch-to-switch between primary and back-up signals. The primary and back-up service access processing system of the turnaround channels 152, the occasional channels 154, and the remote collection facility channels 156 may all be coupled to a receiver transfer unit 176. The receiver transfer unit 176 performs various functions including redundancy switching or selection for choosing between the primary and the back-up outputs of the baseband video server 114 or the service access processing system 116 and providing the chosen signal to an encoder 182. The receiver transfer units 176 may also route the signals for monitoring and redundancy to an HD-SDI monitoring system 186. The receiver transfer units 176 may provide an automatic redundancy mode in which the unit fails to a back-up input upon loss of a primary input signal. The RTU 176 may also be implemented so that a switch back from the back-up to the primary unit may not be automatically performed without manual intervention. The receiver transfer unit 176 may be a switch that is controlled by the advanced broadcast management system 300 (of FIG. 5) to generate an output signal. In the case of a failure of one of the encoders 182, a routing system 186 may be used to route the signal through a back-up encoder 190.

The HD-SDI routing system 186 may provide a plurality of back-up encoders for the various channels. A number of back-up encoders may be provided based on the number of primary encoders. In one example, three back-up encoders for every primary encoder were provided.

The encoders 182 and the encoders 190 encode the video audio closed-captioned data VITC and SCTE 35 data associated within a single chain. The output of the encoder is a single program transport stream that is provided by way of an MPEG-IP interface. That is, the encoders may encode into MPEG4 format. The single program transport stream (SPTS) is coupled to a local area network 130. The local area network 130 may include a plurality of routers 192 that are used to route the single port transport streams to an uplink signal processing system (USPS) 200. Several uplink signal processing systems 200 may be provided. This may include a secondary or back-up USPS that will be referred to as an engineering USPS 200'. The single program transport stream includes identification of the signal so that it may be properly routed to the proper uplink signal processing system. The uplink signal processing system 200 generates an output to an uplink RF system (URFS) 202 that includes a power amplifier. The uplink signal processing system 200 may also provide redundant pairs to increase the reliability of the output signal.

The uplink signal processing system 200 may include a multiplexing splicing system (MSS) 210, an advance transport processing system (ATPS) 212, and a modulator 214. Pairs of multiplexing splicing systems 210, advance transport processing systems 212, and modulators 214 may be provided for redundancy. The multiplexing splicing system 210 multiplexes the single program transport stream from the local area network 130 into a multiplexed transport stream (MPTS). The MSS 210 may also act to insert advertising into the signal. Thus, the MSS 210 acts as a multiplexing module and as an ad insertion module. Various numbers of single-program transport streams may be multiplexed. In one constructed embodiment, eight single program transport streams were multiplexed at each MSS 210. The ads to be inserted at the MSS 210 may be formatted in a particular format such as MPEG 4 format and have various types of digital including Dolby digital audio streams. The MSS 210 may identify insertion points based on SCTE 35 in the incoming stream. The advance transport processing system 212 converts the DVB-compliant transport stream from the MSS 210 into an advanced transport stream such as the DIRECTV A3 transport stream. The ATPS 212 may support either ASI or MPEG output interface for the broadcast path. Thus, the ATPS 212 acts as an encryption module. The ATPS 212 may accept data from the advanced broadcast controller 136 and the advanced program guide system 138. The ATPS 212 may also be coupled to a data broadcast system 226. The data from the ABC 136, the APGS 138, and the DBS 226 are multiplexed into the output transport stream. Thus, the ATPS 212 acts as a data encryption module. As will be described below, the ATPS may also be coupled to the advanced broadcast management system described below in FIG. 4. Error reporting to the advanced broadcast management system (300 in FIG. 5) may include transport level errors, video outages, audio outages, loss of connection from a redundancy controller or a data source, or a compression system controller.

The modulators 214 modulate the transport stream from the ATPS 212 and generate an RF signal at a frequency such as an L-band frequency.

An RF switch 216 is coupled to the primary modulator and back-up modulator 214. The RF switch provides one output signal to the uplink RF system 202.

The ATPS 212 may also receive information or data from a DBS 234. The DBS 234 provides various types of data to be inserted into the broadcast. The data information is provided to the ATPS 212 to be inserted into the program stream. A content distribution system 236 may also be used to couple information to the ATPS. The content distribution system may provide various information such as scheduling information, or the like. The content repository 104 may also be directly coupled to the ATPS for providing various types of information or data.

Referring back to the front end of the ground segment 100, a CONUS local collection facility (CLCF) 226 may be used to collect live content represented by box 228 at a content-provider site or delivered to the CLCF 226 by way of a fiber. A plurality of encoders 230 may be used to encode the signals in a useable format by the system. The encoder signals may be provided to a backhaul internet protocol network 232 and provided to a decoder 162 within the CLCF channels 156 or to a receiver 160 in the CLCF. As mentioned above, if the content is formatted in a usable format, the receiver 160 may not be required. Should the receiver function be required, a receiver may be used in the system.

Several uplink signal processing systems 200 may be provided for any one system. Each of the uplink signal processing systems may correspond to a single transponder on a single satellite. Thus, the combined single program transport streams received at the multiplex splicing system 210 are combined to fit on a single transponder.

A back-up or engineering uplink system processing system 200' may also be provided. The engineering uplink signal processing system 200' may have the same components as the USPS 200. The engineering USPS 200' may be used as a substitute for a particular transponder should one of the primary USPS fail for any reason.

Figure 4:
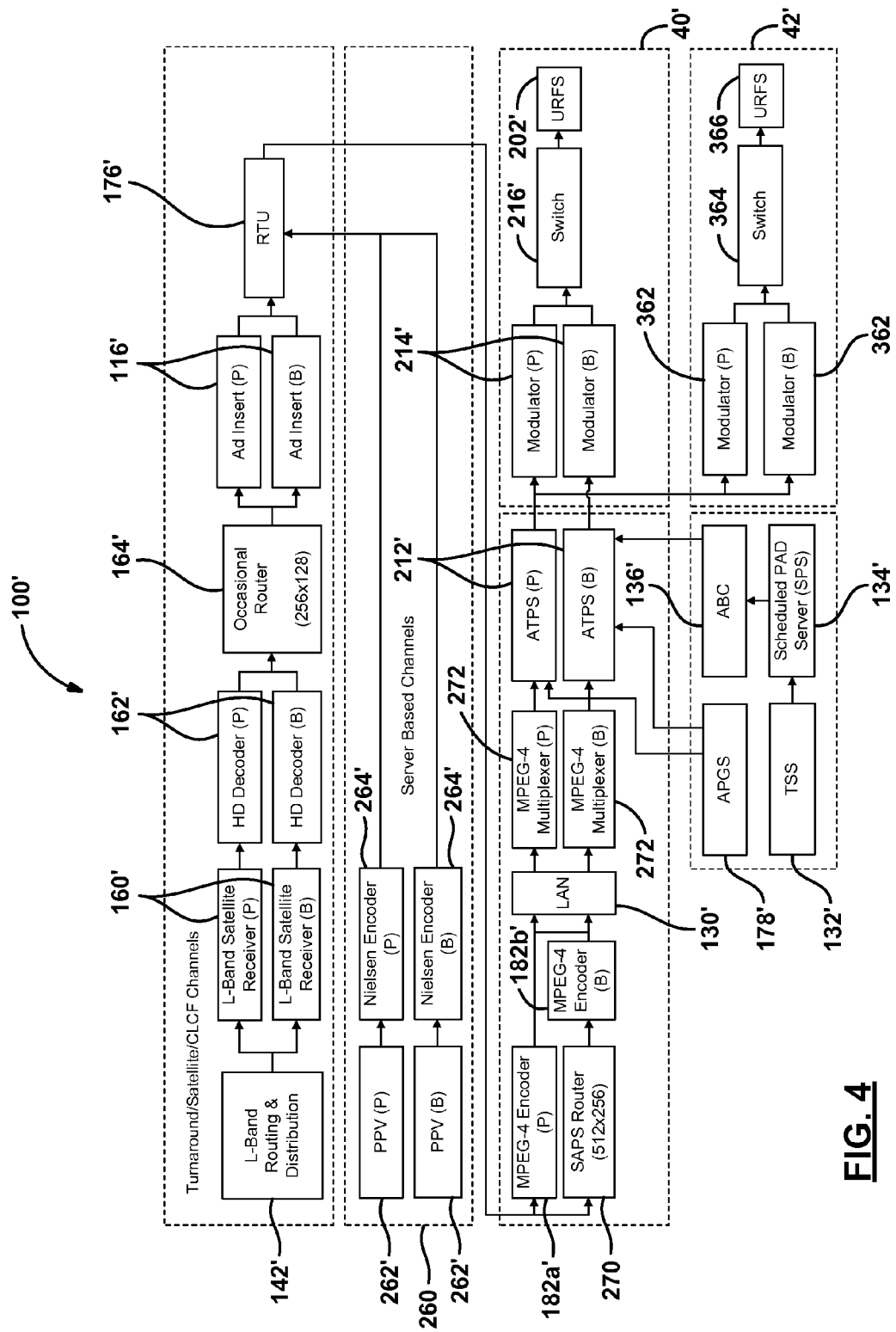
FIG. 4 is a simplified block diagrammatic view of a second embodiment of a ground control system illustrated in FIG. 3.

Referring now to FIG. 4, an alternative ground segment system 100' is illustrated. This view has been somewhat modified from that illustrated in FIGS. 3a and 3b. However, several primary and back-up chains may also be provided. In this embodiment, an L-band distribution and routing system 142' is illustrated. The receivers 160' may be L-band satellite receivers. Primary (P) and back-up (B) satellite receivers 160' may be provided. High definition (HD) decoders 162' may also be provided. An occasional router 164' may receive the decoder signals. A primary and back-up ad insertion module 116' may be an AIS or SAPS module or both.

The HD decoder 162', the occasional router 164' and the ad insertion may include an advanced broadcast monitoring system (ABMS) 300 monitoring and control. The occasional router 164' may also be optional depending on the channel origination. The RTU 176' is dedicated for each turnaround or server-based channel path.

The RTU 176' may also receive server-based channels 260. The server-based channels may come from a primary or back-up pay-per-view module 262'. The primary or back-up pay-per-view module 262' may include the content repository storing various material thereon. Each pay-per-view module may communicate the pay-per-view signals to a primary and back-up Nielsen encoder 264'. The outputs of the encoder 264' may be coupled to the RTU 176'.

The output of the RTU 176' consists of either the primary or secondary signal. The signal from the RTU may be received by the primary MPEG encoder 182a'. A SAPS router 270 then an MPEG 4 encoder 182b' may also receive the signal from the RTU 176'. The signals from the encoders 182a', 182b' may be routed through the LAN 130'.

The multiplexers 272 illustrated in FIG. 3b may be MPEG 4 multiplexers 272' as illustrated in FIG. 4. The encoder 282', the multiplexer 272 and the SAPS router 270 may include advanced broadcast management system monitoring and control and redundancy control via a compression control system (CCS) as will be described below. The back-up encoder 182b' may be controlled by the advanced broadcast management system through the compression control system as will be described below.

The advanced programming guide system 138' may provide programming guide information to the ATPS 212'. The advanced broadcast controller (ABC) 136' may receive information from the schedule PAD server (SPS) 134' which in turn received information from the traffic scheduling system 132'.

The output of the ATPS 132' may be coupled to the primary and secondary modulators 214' of a primary site 40' or a diverse site 42' which in turn are coupled to the switch 216' which in turn is coupled to the uplink RF system 202'. The switch may be an RF or IF switch. The diverse site 42' receives the output from the ATPS 212' at the primary and back-up modulators 362. The output of the modulators may be controlled by a switch 364. The output of the switch 364 may be coupled to the uplink RF system 366.

Referring now to FIG. 5, an advanced broadcast management system (ABMS) 300 is illustrated. The ABMS 300 monitors and controls the various functions of the ground segment 200. Details of the monitoring and control function will be set forth in detail below. The ABMS 300 is coupled to a broadcast control operator (BCO) 302. The BCO 302 is the primary monitoring and control point for various operations. A top-level view of the ground segment 200 may be provided to the broadcast control operator 302. A summary of the status of each channel may also be provided. The BCO may route channels of various transponders to various monitors for monitoring of ongoing problems. Screen displays for the BCO 302 will also be set forth below.

The ABMS 300 may also be coupled to a broadcast operation supervisor station (BOS) 304. The BOS 304 may be implemented as a workstation or station, referred to as consoles. The broadcast operation supervisor station 304 provides additional monitoring control for operation supervisors in addition to those above described with respect to the BCO 302. Video monitors of any broadcast channel, as well as routes associated with critical monitoring points, may be provided to the BOS 304. Also, audio outputs may be selected for monitoring by BOS 304.

A sports central operator (SCO) 306 is utilized for manual ad-insertions typically during sporting events. The SCO 306 may be used to monitor any broadcast channel in the ground segment 200. Monitoring a video quality and audio quality may take place at the SCO 306.

A trigger central (TC) station 308 may also be coupled to the ABMS 300. The trigger central system provides a primary monitoring point for sports-central related activities.

The sports operations supervisor station (SOS) 310 provides an additional monitoring point for the sports central-related activities. The SOS 310 may monitor any broadcast channel in the ground segment 200.

Quality control stations 312 may also be coupled to the ABMS 300. The quality control stations may provide primary monitoring and control point for various technical services and support maintenance and troubleshooting activity. The ABMS may include quality control, both in the primary broadcasting center 314 and the diverse uplink facility 316.

A technical services (TS) station 313 may also be coupled to the ABMS 300. The tech services station 313 allows various technical personnel to view various aspects of the system. The Tech services station operators may be responsible for switching between various redundancies, and the like, depending on the particular operation of the system.

The ABMS 300 may also be coupled to a compression control system (CCS) 340. The CCS 340 may be responsible for the control and configuration management of the encoder and MSS of the USPS. Redundancies of the encoder may also be controlled by the CCS 340. An external interface may be provided at the CCS for encoder and MSS health status monitoring and redundancy control. The total video bandwidth may also be controlled by the CCS 340 through an external interface. The ABMS 300 may also be coupled to the various equipment illustrated in FIG. 3, such as, but not limited to, the RTU 176, the modulator/RF switch 214/216, the ATPS 212, the L band monitoring router 142, decoders 162, the SPS 134, the APGS 138, the TSS 132, the ad insertion module 116, the AIS 124, the CVS 122, the BVS 114, and the modulator/RF switch 214/216 of a diverse site. In short, the ABMS 300 may be coupled to any device that provides data or needs to be controlled in the ground segment 100.

The ABMS 300 may also be coupled to a multi-viewer 341. The multi-viewer 341, as will be described later, may be used to route various signals to form the various views as will also be described below.

The ABMS 300 may also be coupled to an integrated receiver decoder 344 that is used for receiving the signals from the satellite to monitor the quality of a downlink channel signal. Various numbers of IRDs 344 may be used depending on the number of channels to be monitored. The IRDs 344 monitor the downlinked signals received from the satellite.

A redundancy controller 346 may be coupled to the compression control system 340, the ATPS 212 and the modulator/RF switch 214/216. The redundancy controller 340 may be used for controlling various aspects of redundancy of the system in case of a component or component stream failure.

As mentioned above, the ABMS 300 may monitor the Integrated-Receiver-Decoder (IRD) Tuning Control (ITC) 352. ABMS 300 may also be coupled to the ad insertion server 116, which is responsible for management of ad content and ad content delivery to the MSS 210.

A DAL station 354, a PADMON 355, an MVP server 356 and an Evertz® AVM may all be coupled to the ABMS 300. The Evertz® AVM system allows various views and the under monitor displays to display various information. Multiple signals may be displayed simultaneously on one screen using the Evertz® system.

Figure 6:
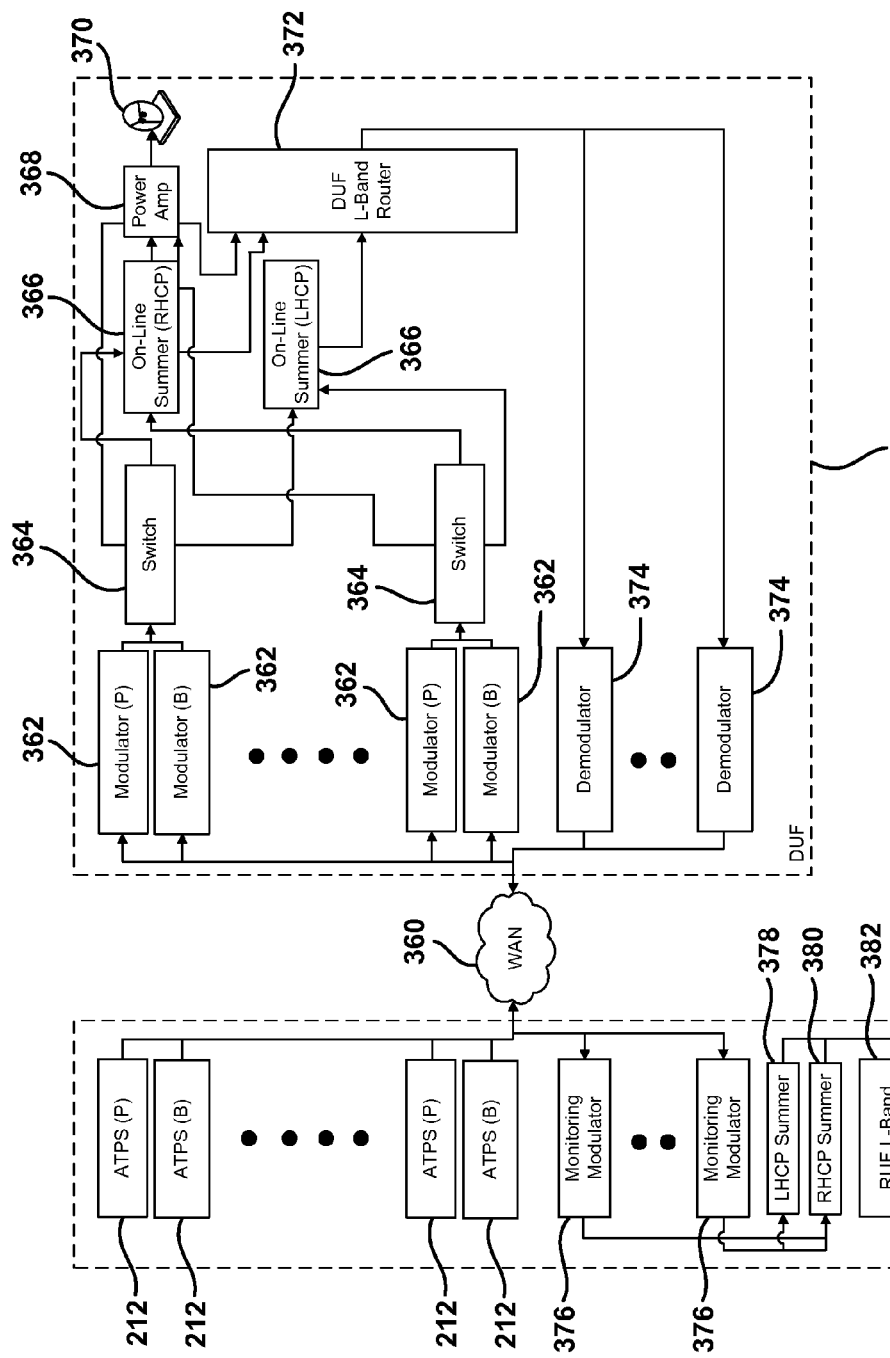
FIG. 6 is a schematic view of a primary and diverse site.

Referring now to FIG. 6, the primary broadcast center 40 and diverse uplink facility 42 are illustrated in further detail. Only the portions relevant to switching between the diverse site and primary site are illustrated. The circuitry within the primary broadcast center 40 is identical to that illustrated above in FIG. 3 except that the ATPS 212 may be coupled to a wide area network 360 in addition to the other circuitry for routing signals to the diverse site 42. Several ATPS pairs 212 are illustrated. Each pair corresponds to a transponder of a satellite.

The wide area network 360 provides signals from the primary and back-up ATPS 212 to a diverse uplink facility modulator 362. Both a primary and back-up uplink modulator 362 may be provided. In fact, a plurality of primary and back-up modulators may be provided for each primary and back-up ATPS 212. A switch 364 may also be provided for each of the pairs of modulators 362. The switch 364 such as an RF or IF switch may be a similar configuration to switch 216 described above.

The output of each of the switches 364 is provided to an on-line summer 366. The on-line summers 366a, 366b may correspond to right-hand circular polarization (RHCP) and left-hand circular polarization (LHCP), respectively, for the system. The output of the summers 366a, 366b are provided to a power amplifier 368 which is then uplinked to the satellite through antenna 370.

The ABMS system 300 may communicate with the modulators 362 so that the primary or back-up modulator may be chosen. This may be accomplished by communicating with both modulators in the transponder pair. The modulators 362 communicate with the switch 364. The switch 364 may also be in direct communication with the ABMS system so that the proper modulator is selected.

The on-line summers 366 have their outputs coupled to a diversity uplink facility L-band router 372. The power amplifier 368 also has an output in communication with the L-band router 372. Thus, signals prior to the amplifier 368 and after the amplifier 368 are communicated to the L-band router for both right-hand and left-hand circular polarization signals. The signals from the on-line summers 366 and the power amplifier are routed to a demodulator 374. A plurality of demodulators 374 may be provided in the circuit. Each of the demodulators 374 corresponds to an input signal provided from each pair of modulators 362. The demodulated signals from the demodulators 374 are communicated through the WAN 360 to the primary broadcast center and to a monitoring modulator 376. A monitoring modulator 376 is provided for a respective one of the demodulators 374. The output of the monitoring modulators 376 is provided to a left-hand circularly polarized summer 378 and a right-hand circularly polarized summer 380. The ABMS system 300 continuously monitors the condition of the switches and the various states of the output signals. The inputs to the diverse uplink facility L-band router 372 are virtually identical to those in the primary broadcast center. All the same signals are available. However, since the primary broadcast center return feed demodulators accommodate only one transponder, there is an individual router output feeding a demodulator for every transponder. There is also an individual off-line summer feed from each of the transponders.

Since the return monitor path to the primary broadcast center is over an IP network (WAN 360), the L-band signals are converted to internet protocol IP signal through demodulators 374. Each demodulator 374 converts one transponder's signals at a time. Therefore, since multiple transponders are likely to be provided in any system, a separate demodulator is provided for each transponder. The corresponding monitoring modulator 376 receives the IP signal and converts the IP signal back to an L-band signal so that the present grouping of channels may be acquired. When switching signals from the primary to the diverse site, the actual signal is selected at the DUF router 372 and the DUF is selected in the primary broadcast center router.

Figure 7:
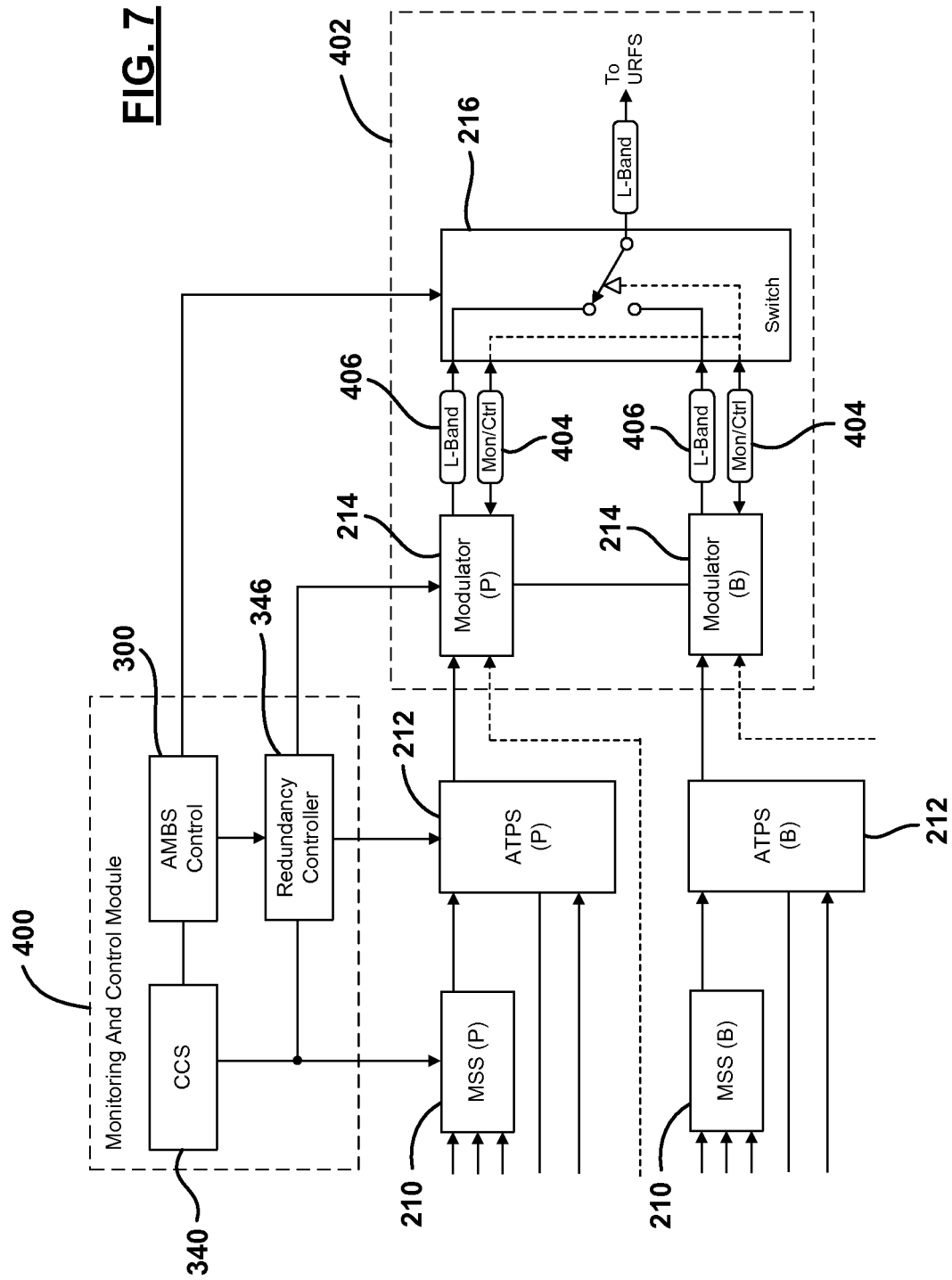
FIG. 7 is a block diagrammatic view of the monitoring and control system for controlling the switching between primary and back-up USPS chains.

Referring now to FIG. 7, the compression control system 340, the ABMS 300 and the redundancy controller 346 may be grouped together as a monitoring and control module 400. The monitoring and control module 400 may act in a similar manner for both the primary and diverse sites as mentioned above with the exceptions described above in FIG. 6. The modulator 214 and the switch 216 may be grouped together in a separate physical location than that of the monitoring and control module 400 and the ATPS 212. The monitoring and control module may communicate with the modulator 214 and/or the switch 216 to receive monitoring signals therefrom. The monitoring and control module may also monitor or control the modulator 214 and the switch 216. A monitoring and control signal may be provided from the monitoring and control module 400 through the modulator 214 to the switch 216 or from the switch 216 to the modulator 214. The monitor and control signal is illustrated as signal 404. The modulator generates L-band signals 406 and communicates them to the switch 216. Although L-band is used throughout the present application as a convenient band for communication, various frequency bands may be used.

The compression control system 340, the ABMS controller 300 and the redundancy controller 346 may all intercommunicate as will be further described below.

Figure 8:
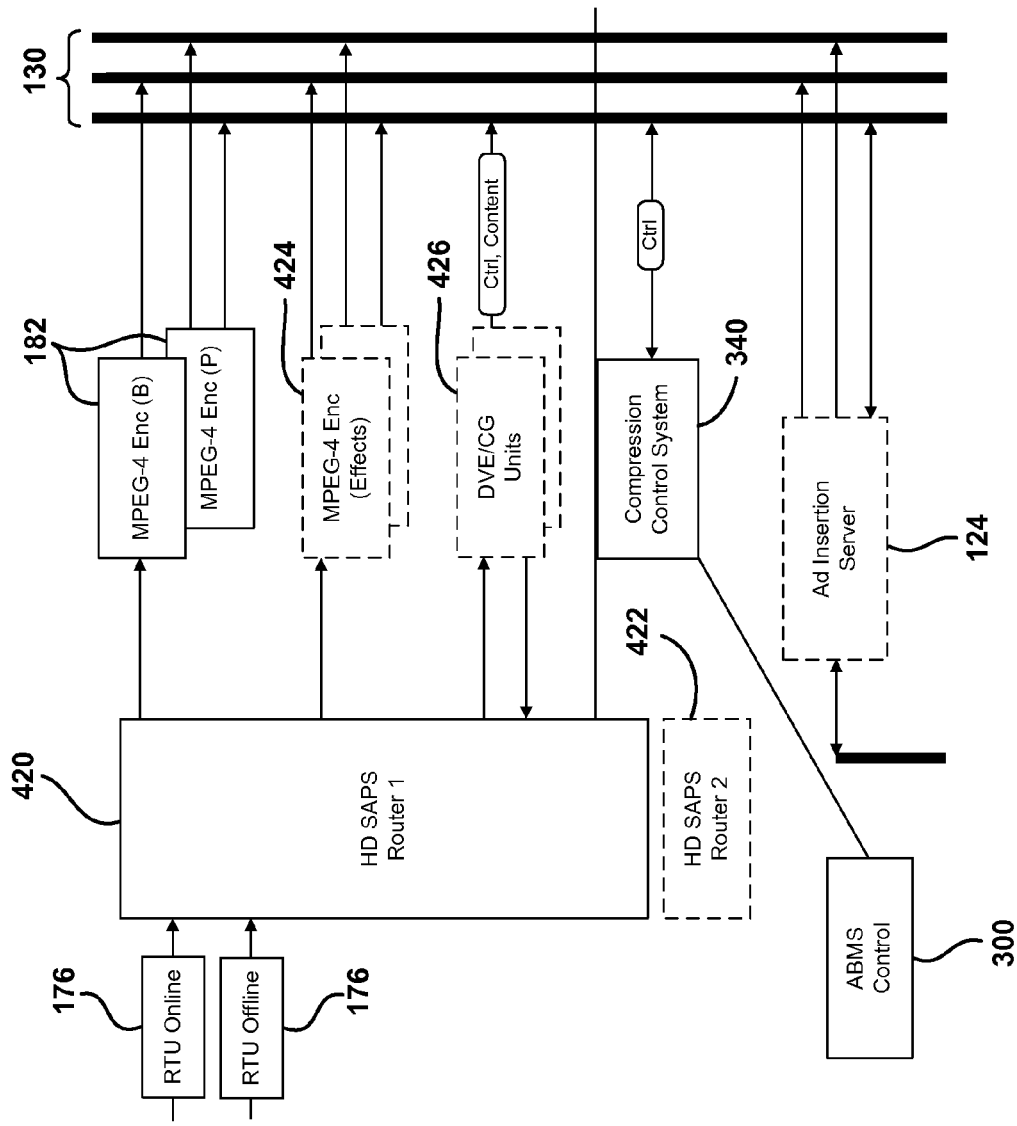
FIG. 8 is a block diagrammatic view of a system for switching to a back-up encoder in the SAPS chain.

Referring now to FIG. 8, the embodiments illustrated in FIGS. 3a and 3b, the RTUs 176 may be routed through a high definition (HD) SAPS router 420. A second SAPS router 422 may be used for back up. The SAPS 420 may be used to route the signals from the RTUs 176 to encoder 182. Should one of the encoders fail, the SAPS router may route the output of the RTUs to a secondary or back-up encoder. The encoders 182 are MPEG encoders which ultimately couple the IP-type signals to the LAN 130. The SAPS router 420 may also be coupled to an effect encoder 424 that is used to insert various effects into the signal. A digital video effects/graphics unit 426 may be used to couple graphics into the SAPS-routed signals. Control and content may be provided to and from the LAN 130 from the DVE/CG unit 426. The entire system and control may be controlled by the ABMS controller 300 and the compression control system 340.

Figure 9:
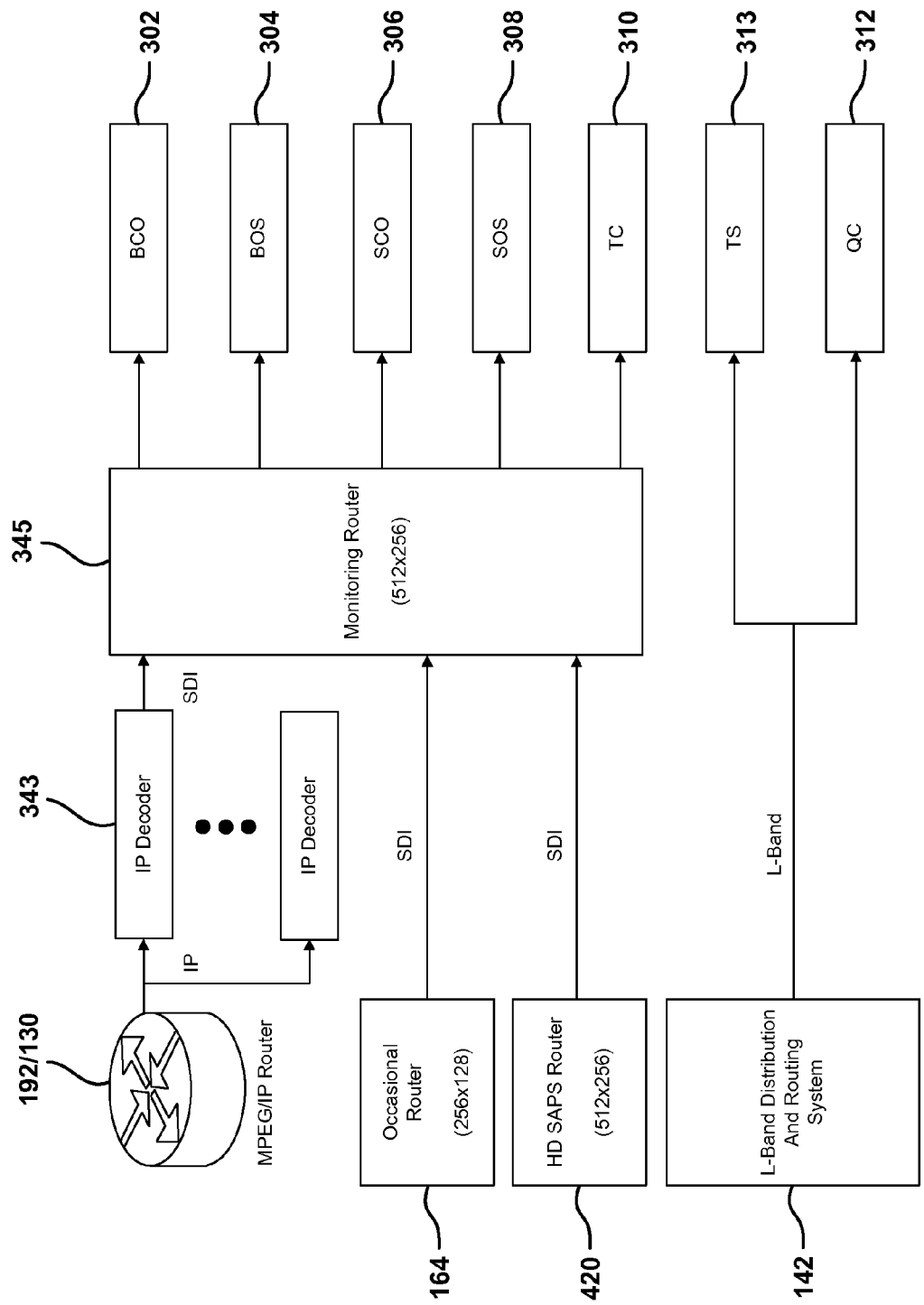
FIG. 9 is a block diagrammatic view of the monitoring system according to the present disclosure.

Referring now to FIG. 9, a simplified block diagrammatic view of the ABMS system is illustrated. The same reference numerals for the various components are used in this example. The present block diagram draws from FIG. 3a and FIG. 5. Serial digital interface (SDI) signals are provided to the monitoring router 345 from the MPEG/IP router 192/130 through decoder 343. Of course, a plurality of IP decoders may be used. Nearly all of the signals at some point pass through the LAN 130 in MPEG or IP form. Therefore, to be useful, the decoders 343 decode the IP signals. The occasional router 164 also generates SDI signals and communicates them to the monitoring router 345.

The HD SAPS router 420 also generates serial digital interface signals and communicates them to the monitoring router 345.

The L-band distribution and routing system 142 generates L-band signals that are communicated directly to a tech services console 313 and to a quality control monitoring console 312. The monitoring router determines the desired signals required by the various consoles 302-313.

Figure 10:
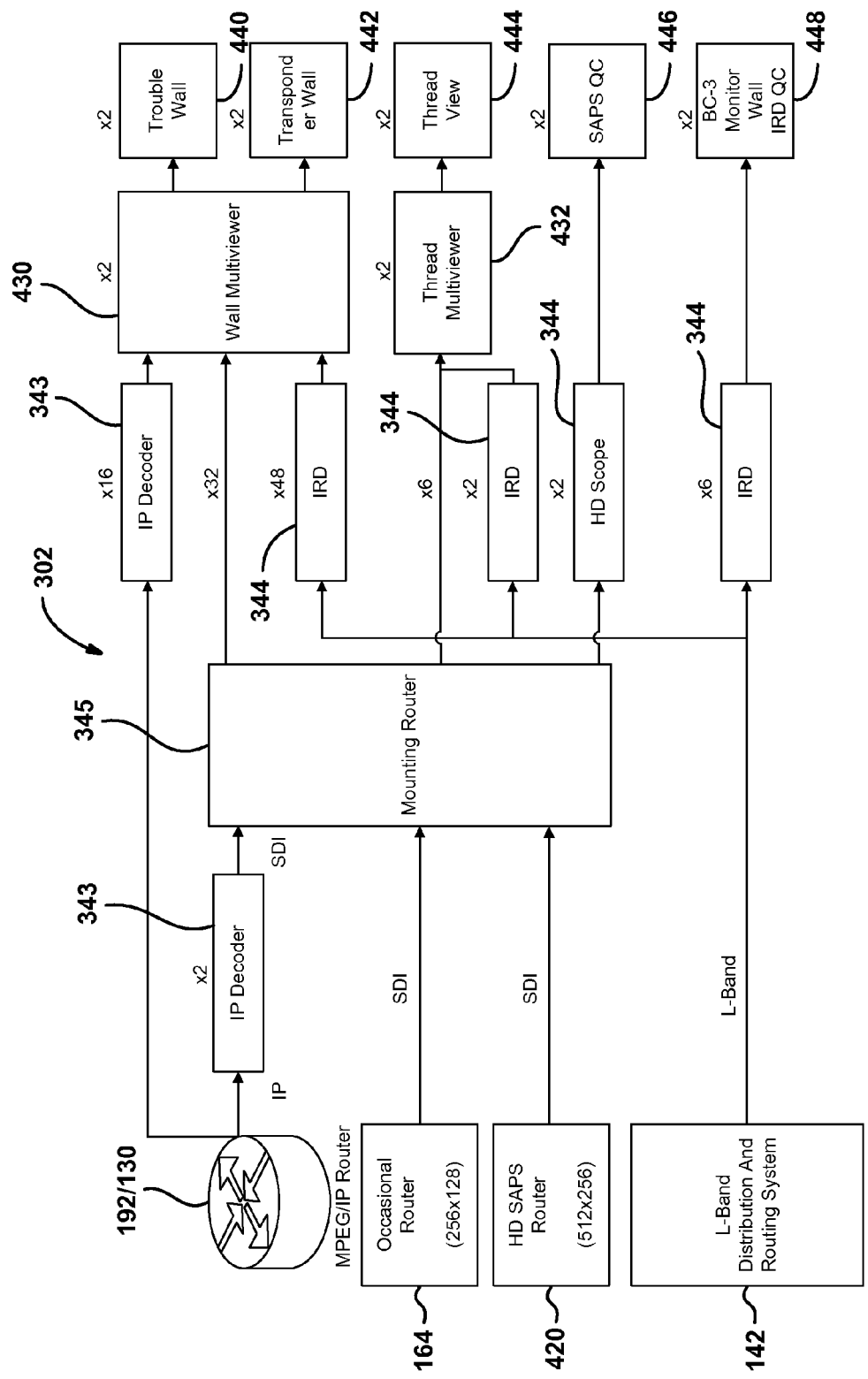
FIG. 10 is a block diagrammatic view illustrating specific configurations of a broadcast central operator monitoring system.

Referring now to FIG. 10, a similar embodiment specific to the broadcast center operator 302 is illustrated. Again, the IP decoders 342 may be used to receive information from the MPEG/IP router 192/130. The IP decoder 342 generates an SDI signal that is communicated to the monitoring router 345. The MPEG/IP router may also generate or communicate signals to an IP decoder without going through the monitoring router 345. The L-band signals from the distribution routing system 142 may be communicated to IRDs 344. The L-band signals are received from an antenna and, thus, correspond to a downlinked signal.

A wall multi-viewer 430 receives IP decoded signals from the IP decoder 343 without processing through the monitoring router and with processing through the monitoring router 345. Various IRD signals for various channels may also be received by the multi-viewer 430. The wall multi-viewer 430 controls the layout of the screen displays that correspond to a trouble wall 440 and a transponder wall 442. The trouble wall 440 and transponder wall 442 will be described further below.

A thread multi-viewer controller 432 receives signals from the monitoring router 345 and from IRDs 344, a thread view 444.

The monitoring router 345 may also generate signals to a high-definition scope 344 which is communicated to a SAPS quality control display 446. The scope may be used to monitor the audio signals.

The SAPS quality control display 446 will be further described below. IRDs 344 may also be directly coupled to an IRD quality control display 448. The IRD quality control display will be further described below.

Figure 11:
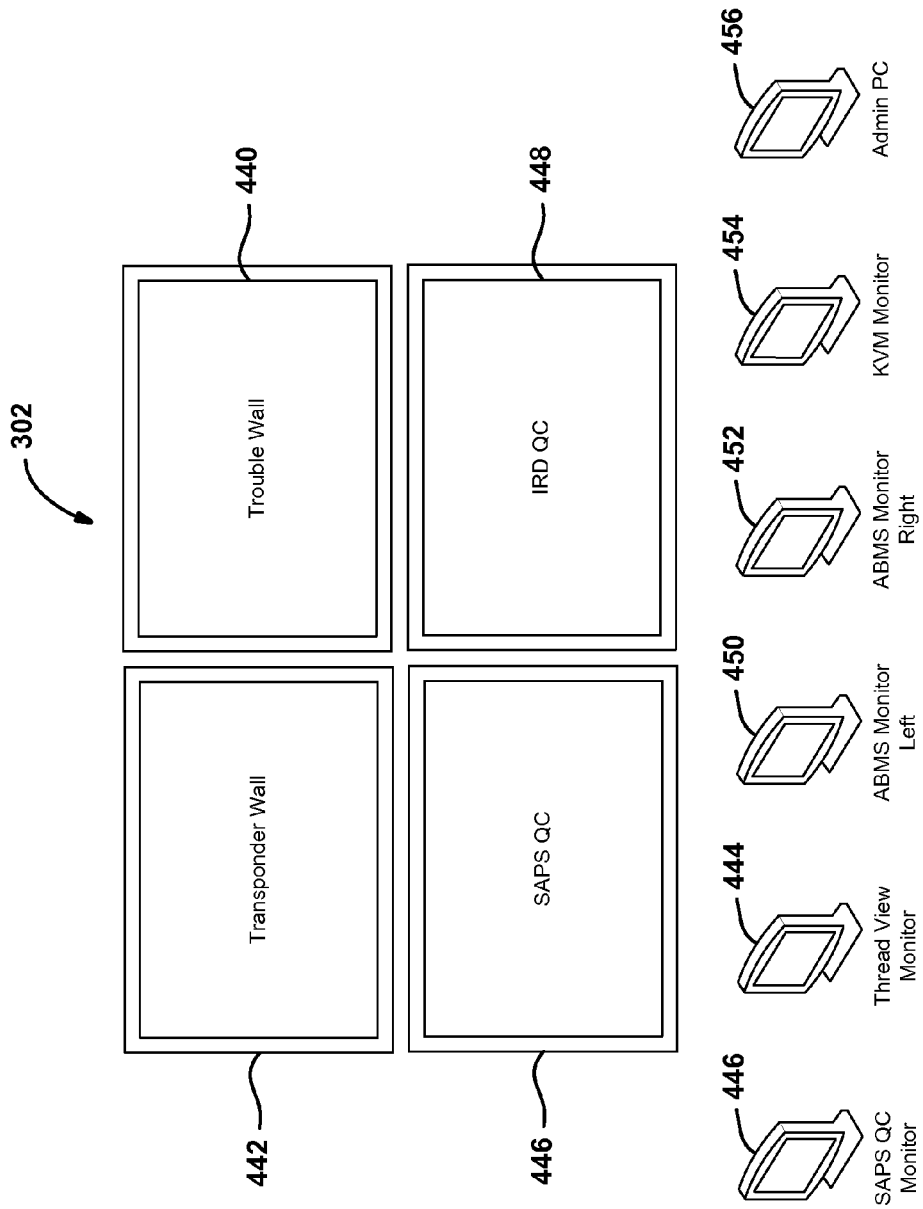
FIG. 11 is a screen display of the broadcast central operator illustrated in FIG. 10.

Referring now to FIG. 11, a BCO console layout is illustrated in further detail. The BCO console 302 may include the transponder wall 442, the trouble wall 440, the SAPS quality control wall 446 and the IRD quality control monitor 448. Wall refers to one or several displays or monitors. A separate SAPS quality control monitor 446 may also be provided. A thread view monitor 444 may also be provided. A touch screen or screens for controlling various aspects of the ABMS system may be provided. One constructed embodiment, a left ABMS monitor 450 and a right ABMS monitor 452, were provided. A KVM (keyboard, video, mouse) monitor 454 may also be provided. The KVM monitor monitors a KVM switch that may be used for controlling the output of various computers with one switch. An administration PC 456 may also be provided for supervising various administration functions.

Figure 12:
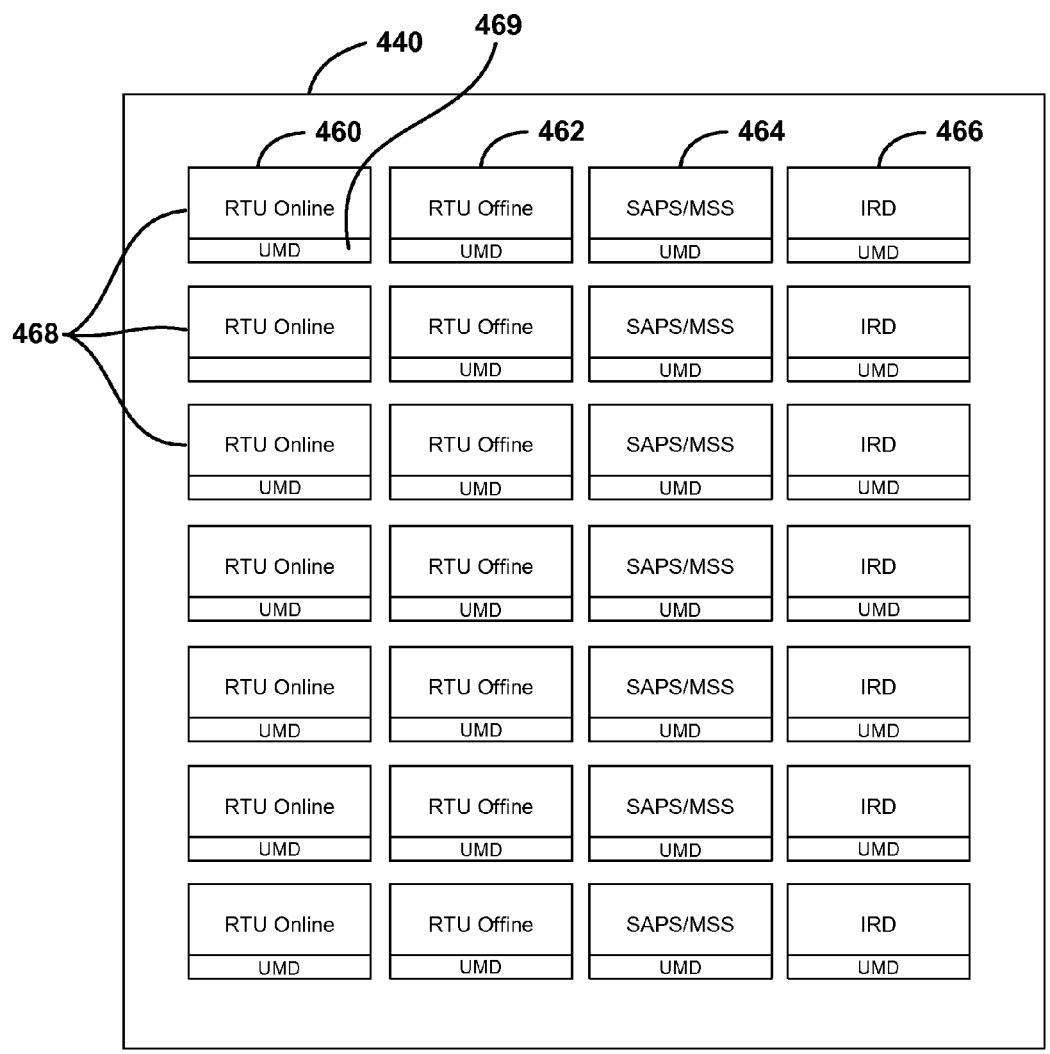
FIG. 12 is a screen display illustrating the layout for a trouble wall of FIG. 10.

Referring now to FIG. 12, an example of a trouble wall 440 illustrated in FIGS. 10 and 11 is illustrated in further detail. Thus, the trouble wall view is essentially a number of thread views disposed in rows for various channels. An RTU on-line view 460, an RTU off-line view 462, a SAPS or MSS view 464 and an IRD view 466 are illustrated. In this embodiment, each row 468 of boxes 460-466 corresponds to a single channel. Each of the rows 468 is independent of any transponder. Preferably, each of the displays 460-466 is located on a large monitor wall. As illustrated, eight independent channels may be viewed at any particular time.

An under monitor display (UMD) 46a may be disposed under each of the various views or displays. The under monitor display may display various information regarding its associated display such as, but not limited to, the channel number, the component or source the view is associated with and the like.

Figure 13:
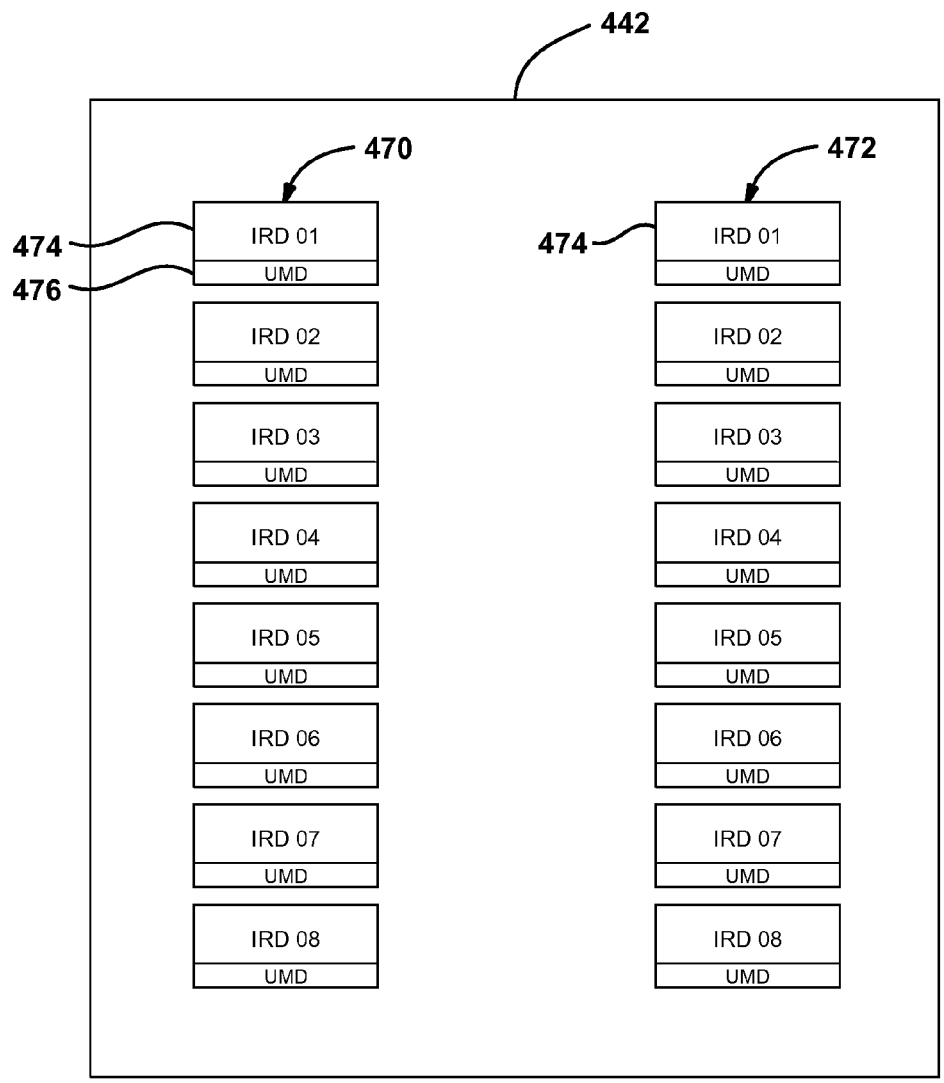
FIG. 13 is a screen display illustrating the configuration of a transponder wall.

Referring now to FIG. 13, a transponder view 442 is illustrated. In this embodiment, the signals downlinked through a transponder, are displayed using columns 470, 472 of displays 474. The ABMS signal sends tuning commands to the various IRDs so that decoding for the specific channel associated with the display 474 may take place. IRD views in the column 470 may correspond to a first transponder. The second column 472 of IRD views 474 may correspond to a second transponder. Of course, only one transponder or even a partial transponder need be displayed on the transponder wall view 442. Each of the displays 474 may have a UMD 476 with various information about the views as mentioned above.

Figure 14:
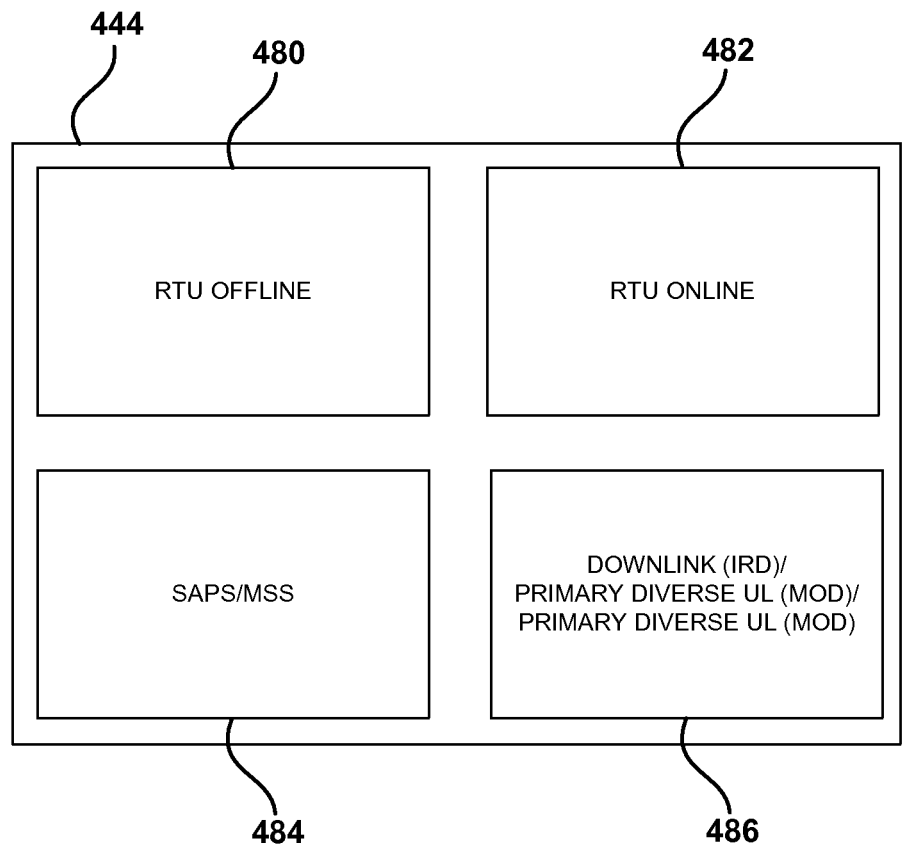
FIG. 14 is a block diagrammatic view of a screen display illustrating a thread view.

Referring now to FIG. 14, the thread view 444 is illustrated in further detail. In this embodiment, various stages of the entire path for one channel may be simultaneously viewed. In this embodiment, an RTU off-line display 480 is illustrated with an RTU on-line display 482. A SAPS/MSS view 484 may also be illustrated. The SAPS/MSS view 484 may also be referred to as a utility view. The fourth view 486 may monitor various conditions including a downlink signal received at an IRD or an uplink signal from the primary or diverse sites. The uplink signals may be monitored from the modulator.

Referring back to FIGS. 9 and 10, the various consoles 304-313 may use a similar configuration to that illustrated in FIG. 10. The broadcast operation supervisor console 304 may consist of a thread view 444, a SAPS quality control view 446 and an IRD view 448.

The sports central operator console 306 may use only the components for the thread view 444. In a monitoring system, several sports central operator consoles 306 may be provided. The SCO consoles 306 may be used for monitoring regional sports networks and various occasional channels.

The sports operation supervisor console 310 may include the thread view 444 and may also include the SAPS quality control view 446 and IRD view 448. The quality control monitoring system layout console 312 may also be laid out similar to that illustrated in FIG. 10. For example, only the thread view, SAPS view, and IRDs may be used with their associated circuitry.

Figure 15:
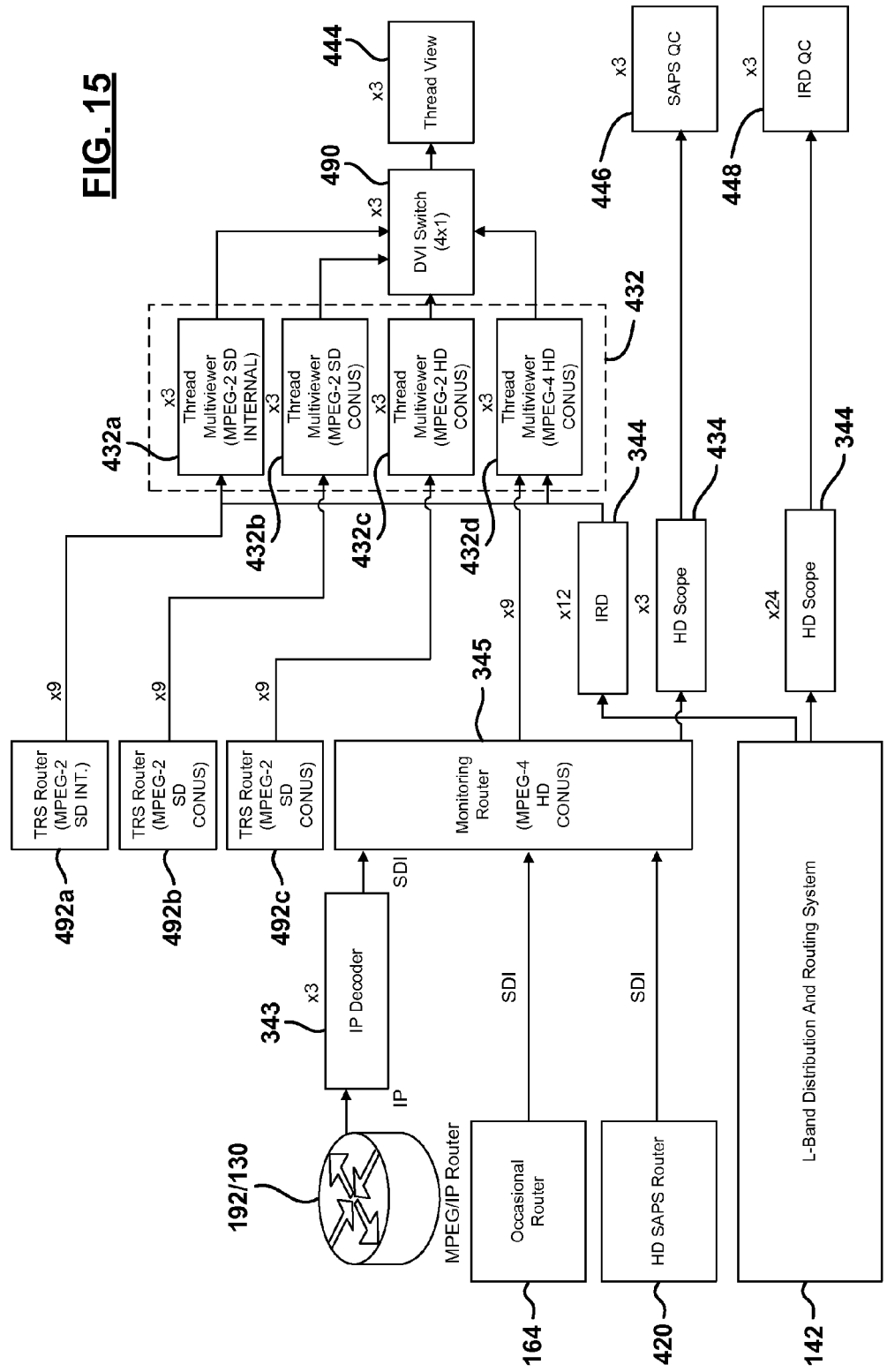
FIG. 15 is a block diagrammatic view of a trigger-central console system.

Referring now to FIG. 15, a system for trigger central monitoring is illustrated. This embodiment is similar to that illustrated in FIG. 10 above for the broadcast control operator. The same reference numerals are used for the same components from FIG. 10. In this embodiment, the multi-thread viewer 432 may include various numbers of multi-thread viewers. For example, a multi-thread viewer for MPEG2 standard definition international channels may be provided at 432a, a thread multi-viewer for MPEG2 standard definition continental United States signals may be provided at 432b, a thread multi-viewer for MPEG2 high definition continental United States channels may be provided at 432c, and MPEG4 high definition CONUS channels may be illustrated at 432d.

The multi-thread viewer 432a may receive standard definition international channels from a TRS router 492a. The thread multi-viewer 432b may receive signals from the TRS router 432b corresponding to MPEG2 standard definition CONUS channels and thread multi-viewer 432c may receive signals from the MPEG2 high definition CONUS TRS router 492c. A digital video interface switch 490 may couple each of the multi-viewers to the thread view 444. Thus, each of the various types of systems and legacy-type systems may be monitored. Such a system may allow the regional sports networks to be monitored in their various formats at one location.

Figure 16:
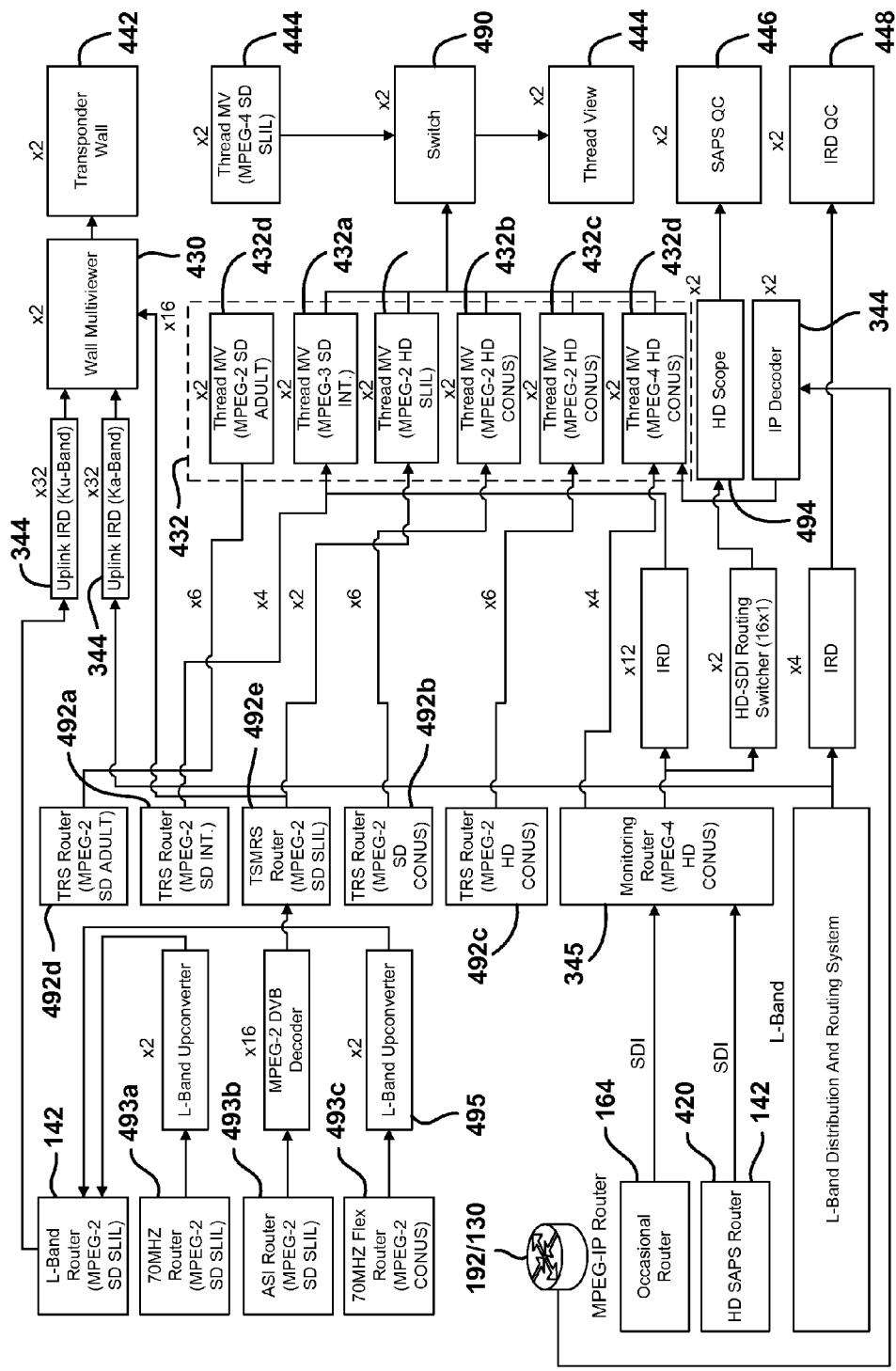
FIG. 16 is a block diagrammatic view of a technical services console.

Referring now to FIG. 16, a text services processing system is illustrated. This embodiment is similar to FIG. 15 with the addition of several components which will be described herein. The common components will not be described separately. In this embodiment, the multi-viewer 432 may include a separate MPEG2 standard definition multi view dedicated to adult content at 432d. In addition, a TRS router 442d may be used to provide the adult content signals to the multi-viewer 432d. This embodiment may be used to support various previous generation systems and include various routers such as a 70 MHz router 493a, an ASI router 432b and a 70 MHz flex router 432c. The 70 MHz routers may be coupled to an L-band converter 495 which communicate the signals to the L-band router 142. The L-band router may route signals to a KU band uplink IRD and then to the wall multi-viewer 430. An IRD dedicated to KA band 344 may receive signals from the L-band distribution and routing system 142. An MPEG2 digital video broadcast decoder may be coupled to the ASI router to decode the signals and provide the signals to the TSMRS router 492e.

The monitoring router 345 may also be coupled to an HDSDI routing switch which in turn couples signals to the HD scope 434.

Figure 17:
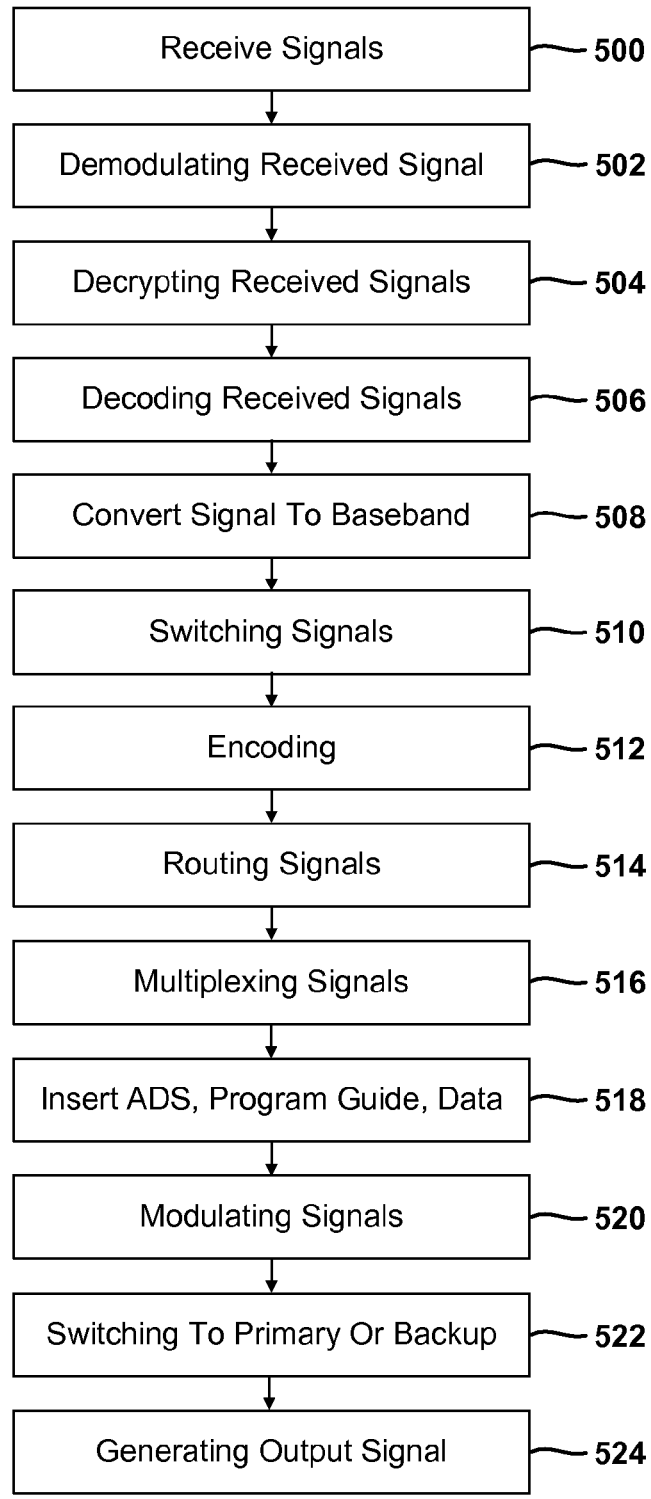
FIG. 17 is a flowchart illustrating switching logic for a primary and diverse site.

Referring now to FIG. 17, a summary of a method of operating the system of the ground segment of FIGS. 3A and 3B is illustrated. In step 500, various signals are received. The signals that are received may be file-based content, tape-based content, or live content delivered in various manners including tapes, files, DVDs, satellite, or fibers.

In step 502, the receive signals may be demodulated if the signals are required. In step 504, the receive signals are decrypted, also as if required.

In step 506, the signals are decoded. The decoded signals may be in a high definition serial digital interface (HD-SDI) format. The decoded signals may be provided to a service access processing system or a baseband video system where they may continue to be processed. The service access processing system may convert the signal to baseband. In step 510, the primary or back-up signals that are converted to baseband may be selected or switched and provided to an encoder. Also, the switching unit may also provide this signal to a routing system for monitoring and redundancy check. In step 512, the switched signals are encoded and in step 514 the signals are routed through a local area network to a multiplexer. The multiplexer multiplexes the signal in step 516. Several signals may be multiplexed together.

In step 518, the advanced transport processing system may insert various conditional access data, program guide information or other advertising or other data into the system in step 516. After step 518, the signals are modulated in step 520. Preferably, as mentioned above, a primary and back-up multiplexing system, advance transport processing system and a modulator are provided. In step 522, switching to the primary or back-up signal is performed in a switch. The output of the switch is used to generate an output signal such as an uplink signal at an uplink RF system.

Figure 18:
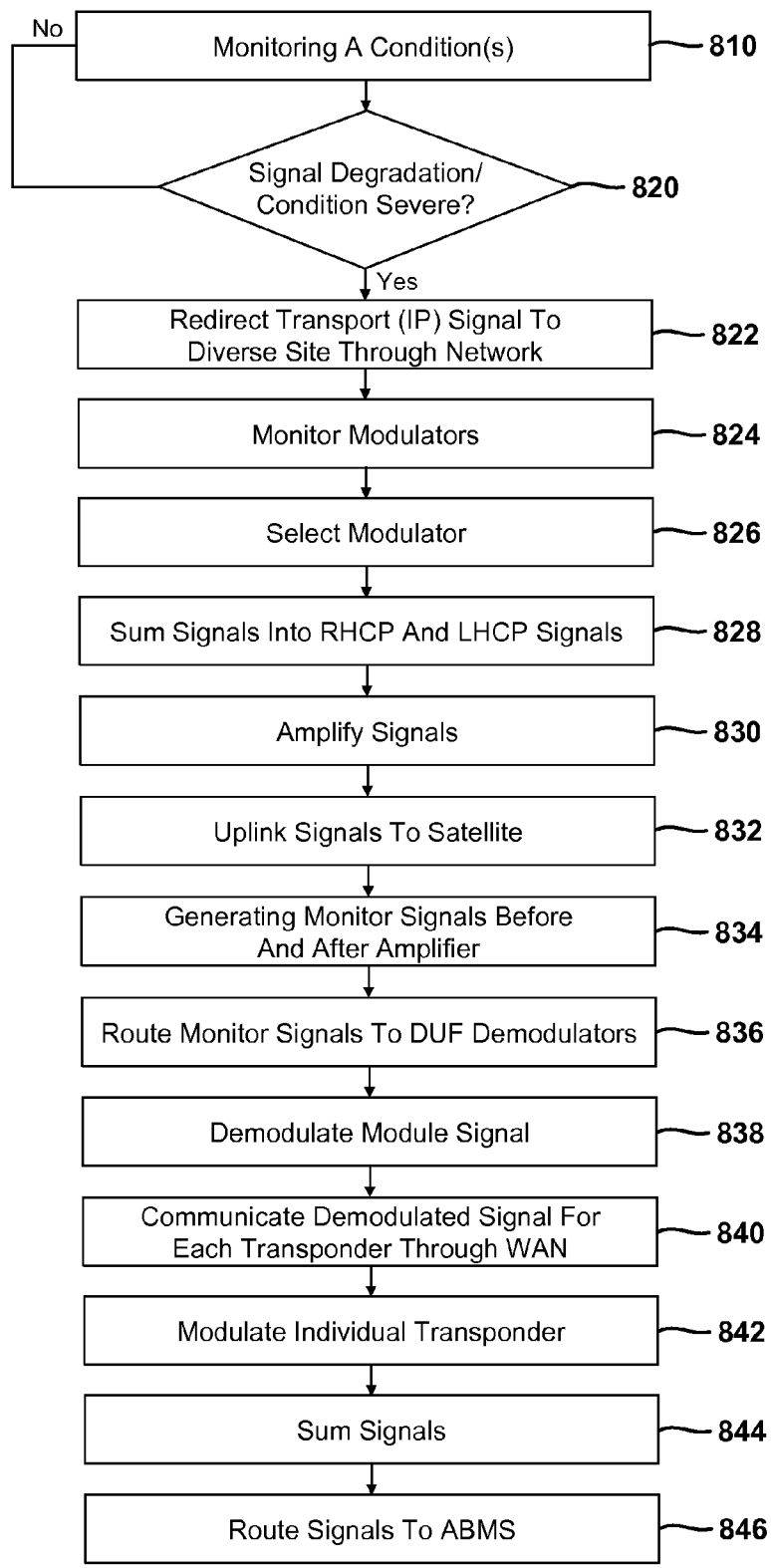
FIG. 18 is a flowchart illustrating a method for switching between a primary site and a diverse site.

Referring now to FIG. 18, a method of controlling the signals from a primary broadcast facility to a secondary or diverse broadcast facility is illustrated. In step 810, the ABMS system monitors various conditions. The monitored signals may include various signals throughout the system, including the uplink signals, downlink signals, the multiplexed signals, the modulator signals, the ATPS signals and so on. Predictive weather signals from outside ABMS may also be used to control transmission from the primary facility to the diverse uplink facility. In step 820, if no degradation occurs, the monitoring of the signal is continued. In step 820, if signal degradation does occur, step 822 redirects the transport IP signals from the ATPS to the diverse site through the IP network. It should be noted that redirection may continually occur during the operation of the system. In this manner, the operation of the components within the diverse USPS may be monitored. The determining factor changing the for uplinking location may be the switching of the power amplifier on or off at the primary and diverse sites. This allows various signals and conditions within both the primary and diverse facilities to be continually monitored.

In step 824, the modulators of the diverse site are monitored. In step 826, a modulator is selected based upon the monitoring. In step 828, the signals are grouped into a right-hand circularly polarized signals and left-hand circularly polarized signals. Of course, if only one polarization is desired, only a single summer may be required. The summed signals are then amplified and formed into amplified signals in step 830. The power amplifier is active at the diverse site when the diverse site is uplinking signals. In step 832, the amplified signals are uplinked to the satellite. The uplinked signals may use various frequencies for uplinking, including Ka or Ku. In step 834, the monitor signals are generated both before and after the amplifier.

In step 836, the monitored signals are routed to the demodulators within the diverse uplink facility. The demodulators correspond to a single transponder output. The demodulators demodulate the signals from the router in step 838. After demodulation, the signals return to their IP state for transmission through the WAN. In step 840, the demodulated signals for each transponder are communicated through the WAN. In step 842, the individual transponder signals are communicated through the WAN to the primary broadcasting center. The transponder signals are then modulated at individual monitoring modulators. In step 844, the signals are reassembled and summed into left-hand circularly polarized sum signals and right-hand circularly polarized sum signals. In step 846, the signals are routed to the ABMS for displaying on one of the various displays. By providing both pre- and post-power amplifier signals, the on-line uplinking facility, whether it is primary or diverse, may be easily ascertained by the operators.

Figure 19:
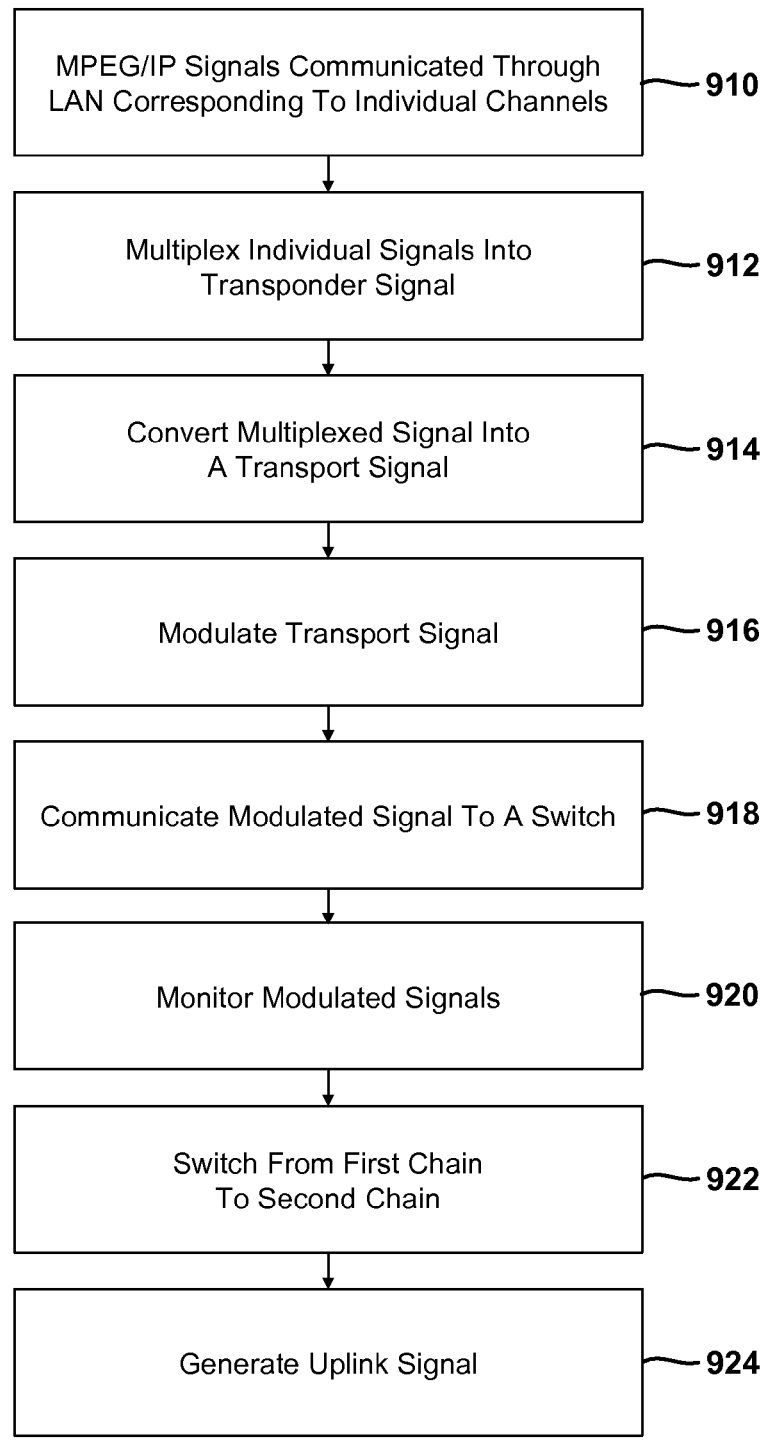
FIG. 19 is a flowchart illustrating a method for switching between a first USPS chain and a second USPS chain.

Referring now to FIG. 19, a method for redundancy switching between a primary uplink signal processing chain and a secondary uplink signal processing chain is illustrated. In step 910, the MPEG/IP signals are communicated through the LAN corresponding to the individual channels. The signals are grouped at the multiplexers into individual transponder signals that contain the individual channels in step 912. The multiplexed signals are then provided to the advance transport processing system to convert the multiplexed signals into a transport signals in step 914. The transport signals may be transmitted to the diverse site as mentioned above in FIG. 18. The transport signals are then modulated by the modulators and communicated to a switch. The multiplexing transport processing system and modulator may be referred to as a chain. As illustrated in FIG. 3b, a primary and back-up chain may be provided. The ABMS may monitor the chains directly at the modulators or at the switch in step 920. Both the on-air and off-air modulators may be monitored. In step 922, the switch may be changed from the first USPS chain to the second USPS chain if an irregularity or error is provided in the first chain. The ABMS system may be used to switch control of the entire chain. That is, the entire chain from the multiplexer, the transport processing system and the modulator may be entirely switched from a primary chain to a back-up chain should any errors occur. Both the monitoring and controlling may be performed using the ABMS system and the various displays described above. The switching over may take place by the ABMS identifying the compression control system for the designated channel or dedicated transponder. The ABMS system may send a command to the designated compression control system (CCS) to switch to the off-line multiplexer for the designated channel or designated transponder. The ABMS system may await a multiplexer replacement verification from the CCS and update the device that is indicators for both the primary and back-up muxes for the selected channel. A command may then be sent to the ATPS to switch to the off-line ATPS for the designated channel or designated transponder. A verification may be performed and the screen displays or status indicators may be updated. Thereafter, a command may be sent to the RF switch to switch to the off-line modulator. A verification signal for modulator replacement may then be generated. The output of one of the modulator may be controlled by the switch and selected to form an uplink signal in step 924. It should be noted that the compression control system may be used to control the switching of the multiplexer from the on-line multiplexer to the off-line multiplexer. The commanding of the multiplexer, the ATPS and the modulator may be performed in a sequence. However, the ultimate outcome is switching the entire primary uplink signal processing chain to the secondary or back-up uplink signal processing chain.

Figure 20:
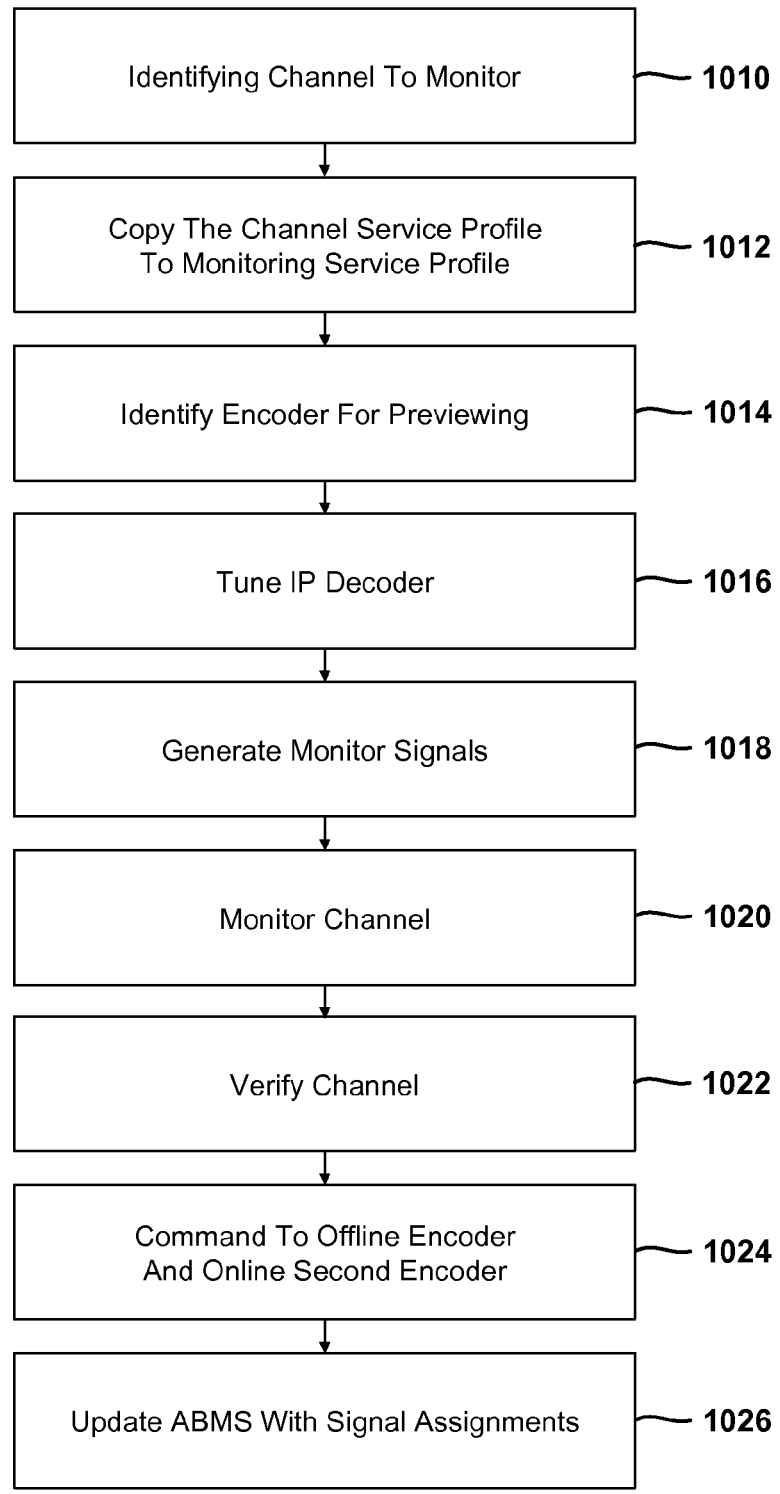
FIG. 20 is a method for switching between a first encoder and a second encoder using the same SAPS screen.

Referring now to FIG. 20, a method of monitoring and operating the service access processing system (SAPS) is illustrated. The process may be described as a "look-before-leap" process since the output signal of the back-up encoder selected may be previewed before actually switching from the primary encoder to the back-up encoder.

In step 1010, while a first encoder is providing a first encoded signal to the uplink signal processing system which ultimately is used to generate the first broadcast signal, the first channel stream to monitor is identified by the ABMS system. The compression control system is identified for the designated channel. In step 1012, the channel service profile is copied to the monitoring service profile. In step 1014, the compression control system may automatically identify a back-up or secondary encoder for previewing the channel. An unused encoder may be selected. The available secondary encoder is identified and a status indicator for a mirroring state is updated on the ABMS system display. The IP decoder for the console is configured to join each of multicast addresses for the monitoring service profile. The IP decoder of the ABMS channel is tuned to the selected channel's packet identification (PID). In step 1018, the various monitor signals may be generated on the monitoring system (ABMS) display. The monitor signals may correspond to the signals in the thread view described above. In step 1020, the operator monitors the channel. A preview window of 90 seconds may be provided. If no action is taken, no switching occurs. The operator may decide not to switch after previewing. This is the "look" portion or "preview" portion. It should be noted that during the monitoring process, the HD SAPS router may be changed to route this channel signal to the preview or secondary encoder. Thus, the second encoder is used during the monitoring process with the same signal stream currently broadcasting or "on-line". The channel signals may be verified in step 1022. A command may be sent through the ABMS system to the off-line encoder to place the off-line encoder on-line and the on-line encoder off-line in step 1024. In step 1026, the signal assignments are updated in the ABMS system for the encoder that is now being used for the particular channel.

When switching between a first encoder and a second encoder, various parameters may be reviewed. Signals that do not appear clear due to various types of system malfunctions or non-existing signals may be quickly identified and a back-up encoder may be used. The encoded signals are IP signals that form a single program transport signal for distribution over the local area network.

Figure 21:
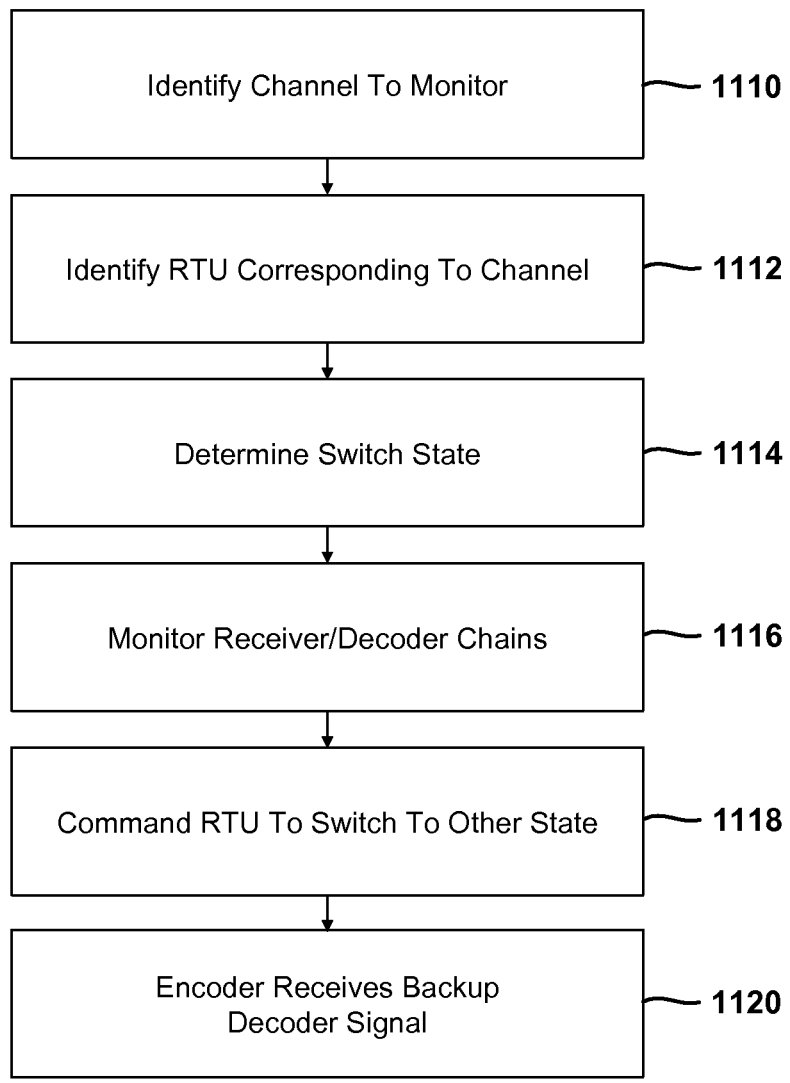
FIG. 21 is a flowchart illustrating a method for switching between a first receiver and decoder stream and a second receiver and decoder stream.

Referring now to FIG. 21, a method of switching from one receiver/decoder chain of a channel to a second receiver decoder chain is set forth. In step 1110, a channel to monitor is identified. In step 1112, the RTU corresponding to the channel to monitor is identified. In step 1114, the switch state is determined. In step 1116, the ABMS system monitors the primary and back-up receiver decoder chains. This may be performed by monitoring the SAPS 116 of FIG. 3*a* or by monitoring the RTU 176 in FIG. 3*a*. To switch between the primary and back-up receiver decoder chains, the RTU may be commanded to the other state. The encoder then receives the back-up signal from the back-up receiver and decoder if the system was switched from the primary to the back-up system. In step 1120, the encoder receives the back-up decoder signal and generates IP signals and couples the IP signals to the local area network 130. The encoder signals correspond to a single channel signal that are then grouped together at the multiplexer and processed through the uplink signal processing system. Both the off-line and on-line view may be monitored by the ABMS system.

Figure 22:
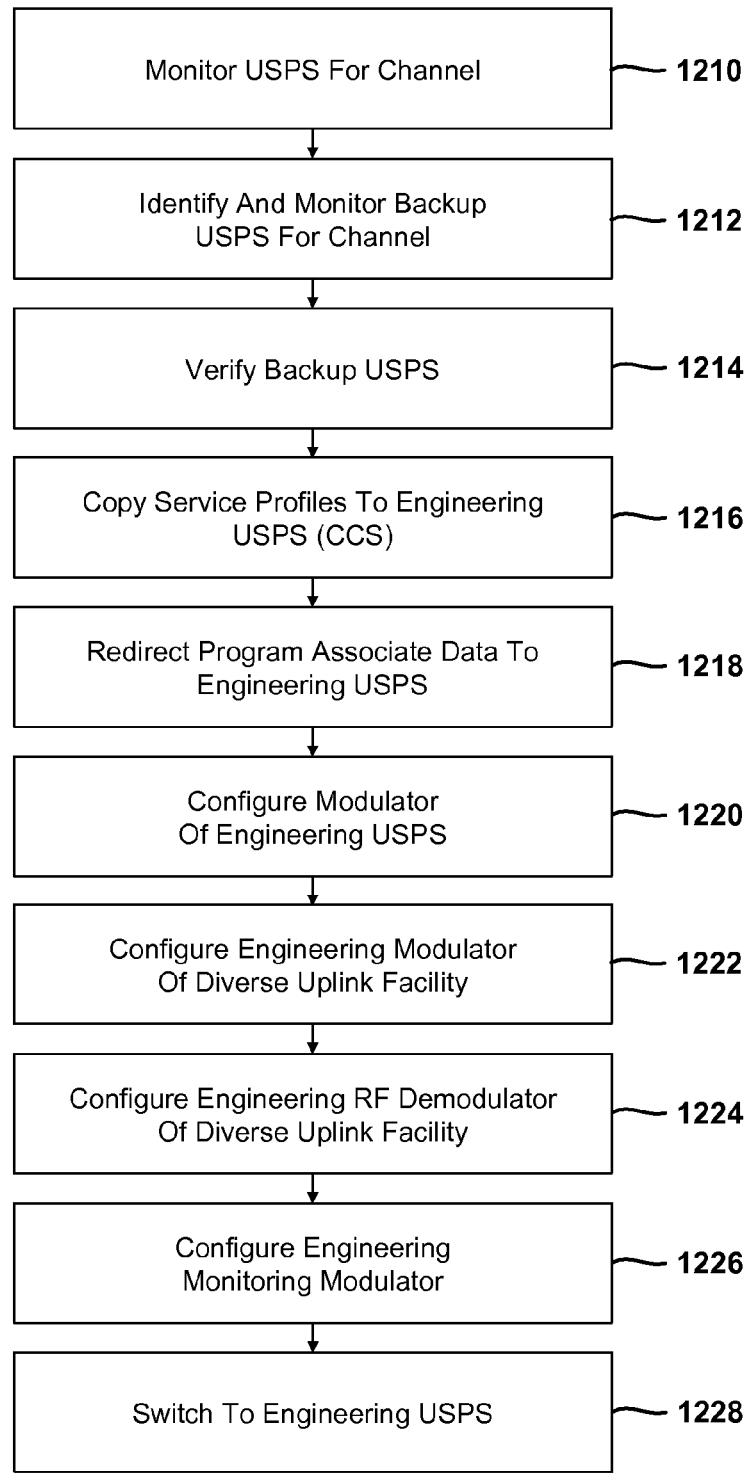
FIG. 22 is a flowchart of a method for switching between a primary or uplink signal processing chain and an engineering uplink signal processing chain.

Referring now to FIG. 22, as mentioned above, the uplink signal processing system corresponds to a single transponder. However, if components fail in both the primary and back-up systems or maintenance must be done to the primary system, it may be desirable to switch the entire transponder to a second USPS. This may be referred to as an engineering USPS (200' of FIG. 3B). A number of secondary or engineering USPS's may be included in a system. The number may vary depending on the system requirements.

In step 1210, the USPS for the channel is identified and monitored. In step 1212, the back-up USPS for the channel is identified and monitored. In step 1214, the back-up USPS is monitored and determining whether or not the system is currently being used for on-air is determined. If the back-up USPS is not being used for on-air production, the service profiles for the primary USPS is copied to the back-up USPS. This may be performed by communicating the service profiles from the designated CCS for that transponder to the engineering CCS. This may be performed by transferring the profiles from the primary corresponding compression control system to the back-up compression control system. This may include copying the on-air multiplexer profile to the secondary or engineering multiplexer profile. The ATPS settings may also be copied as part of the service profiles to the back-up USPS. Copying the service profiles is performed in step 1216. In step 1218, program-associated data from a schedule pad server may be redirected to the engineering USPS by commanding the associated SPS to mirror the PAD settings from the on-air USPS to the engineering USPS. More particularly, the program-associated data is redirected from the primary ATPS to the engineering ATPS in the engineering USPS.

In step 1220, the modulator settings of the primary USPS are used to configure the back-up USPS. In step 1222, the modulator of the diverse uplink facility is configured. That is, the data settings used for the modulator may be configured to the engineering USPS modulator. Thus, both the diverse USPS and a primary USPS may have a primary and engineering USPS. In step 1224, the demodulators of the engineering USPS at the diverse uplink facility is configured by copying the service profile thereto.

In step 1226, the monitoring modulator at the primary broadcast center may also include an engineering function. The profiled from the monitoring modulator at the primary broadcast facility is copied to an engineering monitoring modulator.

Once all the configurations have been made, step 1228 switches from the primary USPS to the engineering USPS.

Figure 23:
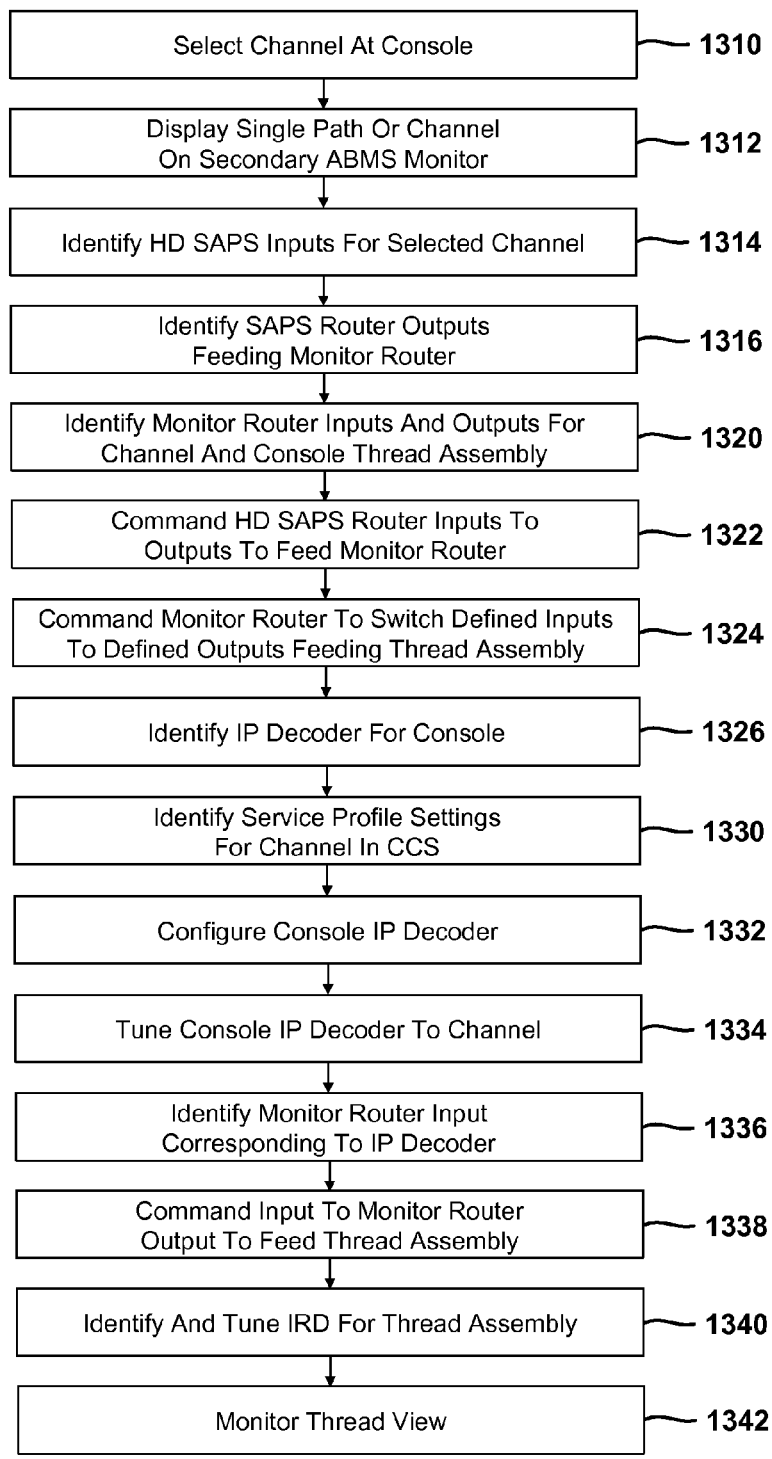
FIG. 23 is a flowchart for a method of forming a thread view.

Referring now to FIG. 23, a method for displaying a thread view such as that described in FIG. 14 is illustrated. The thread view is a graphical user interface to assist the operator in determining where an error in the signal path occurred. Status of the on-air devices is displayed. The following sets forth a method as performed by the advanced broadcast management system. In step 1310, the operator or software, on an exception basis, selects the channel for viewing. This may be performed by highlighting the channel selected on a channel selection panel associated with an ABMS monitor. The channel may be selected by a touch screen or other interface.

In step 1312, the signal path of the channel may be displayed on a secondary ABMS monitor. In step 1314, the HD SAPS router corresponding to the RTU sources for the channels selected are identified. In step 1316, the SAPS router outputs feeding the monitor router are identified. In step 1320, the monitor router inputs corresponding to the console where the channel was selected is identified and the outputs of the monitor router feeding the console's thread assembly or viewer displays are identified. In step 1322, the HD SAPS router inputs are commanded to the defined outputs that feed the monitor router. In step 1324, the monitor is commanded to switch the defined inputs to the defined outputs that feed the dedicated thread assembly for display. In step 1326, the dedicated IP decoder for the console where the channel was selected is identified. In step 1330, the service profile settings for the channel in the compression control system is identified. This may be performed by identifying each IGMPv3 source multicast addresses for the selected channel's profile in the CCS. In step 1332, the console IP decoder is configured to join each of the IGMPv3 source multicast addresses selected for the channel-to-service profile in the CCS. In step 1334, the console IP decoder is tuned to the channel. This may be done using the channel's packet identification (PID). In step 1336, the monitor router input corresponding to the IP decoder is identified. The monitor router output feeding the console's dedicated threat assembly is also identified. In step 1338, the monitor router is commanded to switch the defined input to the output that feeds the console's thread assembly or monitor. In step 1340, the IRD for the thread assembly is identified and tuned. The thread assembly may then be commanded to display the preset that shows all of the thread sources and displays the on-line SAPS in the window views. Thus, the operator is able to monitor the thread view in step 1342. A signal path graphical user interface may be displayed to allow the operator to quickly make changes and resolve outages.

Figure 24:
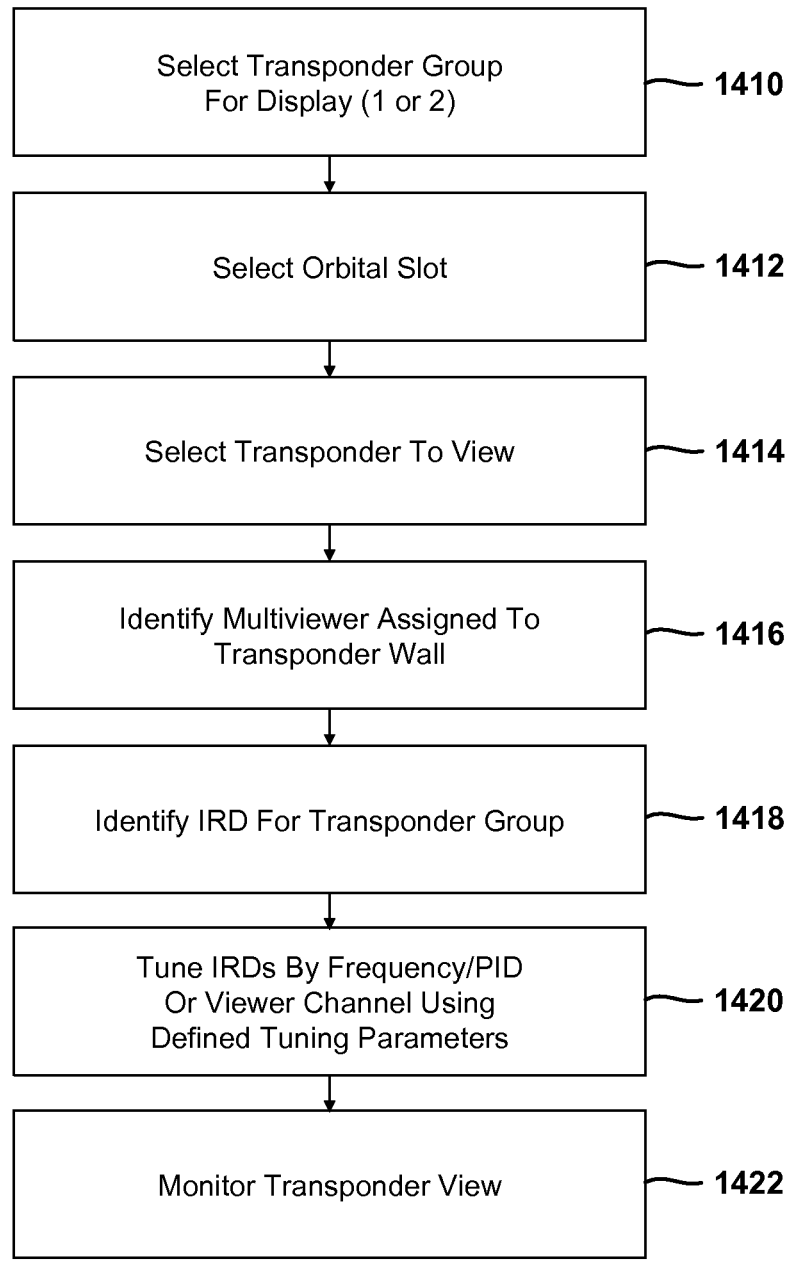
FIG. 24 is a flowchart for a method of forming a transponder view.

Referring now to FIG. 24, a method for operating the advanced broadcast management system to generate a transponder view is illustrated. In step 1410, the ABMS software or the operator selects the group of IRDs to route the transponder to and selects the group from a transponder wall selection panel that may be displayed on the ABMS display. As illustrated above, a transponder wall may include transponders for two transponders in two columns. Thus, a transponder group for column one or two is displayed. The software may detect errors in the signal and tune to the particular transponder. The ABMS system may be an exception-based system.

In step 1412, the orbital slot for the transponder to view is selected. In step 1414, the transponder to view from that orbital slot is selected. This may also be performed by a transponder wall selection panel on the ABMS system. The multi-viewer assigned to the transponder wall is identified in step 1416. In step 1418, the IRD for the transponder group is identified. A command may be sent to the respective input card on the designated multi-viewer for changing the display for each channel.

In step 1420, the IRD is tuned by frequency or PID or viewer channel using the defined tuning parameters for each channel on the transponder selected. In step 1422, the monitor displays the transponder view.

Figure 25:
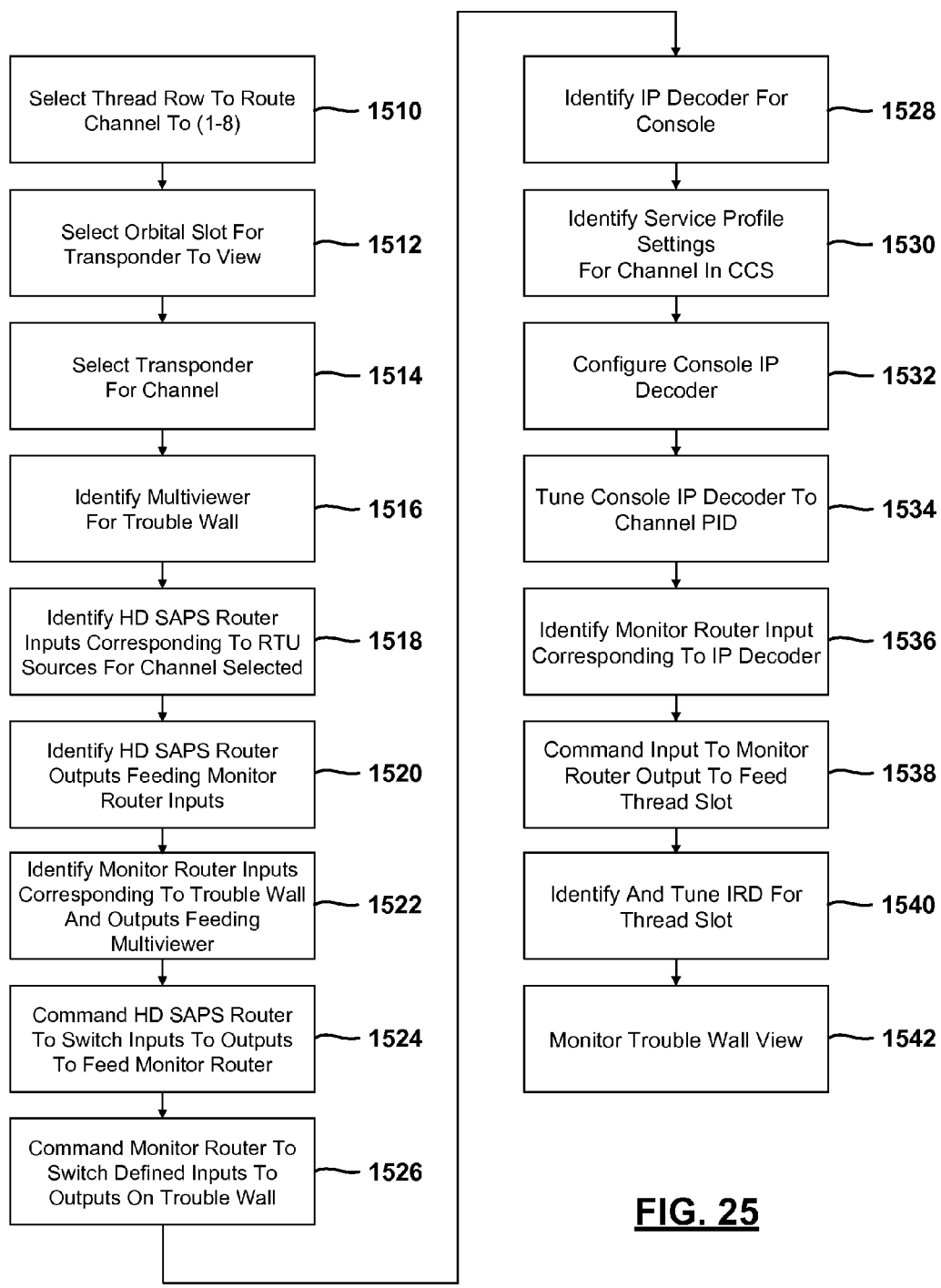
FIG. 25 is a flowchart for a method of forming a trouble wall view.

Referring now to FIG. 25, a method for operating the advanced broadcast management system to display the trouble wall view described above is illustrated. The trouble wall view allows the operator to "park" a channel or number of channels for monitoring. This is useful for tracking intermittent problems. Under ideal conditions, no channels will have issues and the thread view may be blank. In step 1510, the thread view slot or row to route the channel to is selected. As illustrated above, eight rows corresponding to eight thread views are illustrated. Each row may be referred to as a slot. Selections may be formed on a trouble wall selection panel associated with the ABMS. In step 1512, the orbital slot for the transponder to view is selected by the operator. This may also be formed by selecting the transponder wall selection.

In step 1516, the multi-viewer associated with the trouble wall is identified. A recall preset command may be triggered to recall various presets that correspond to a trouble wall view.

Also, in step 1516, the under monitor display for each of the displays may be updated with information regarding the display such as its source type.

In step 1518, the HD SAPS router inputs corresponding to the RTU sources for the channel are identified. In step 1520, the HD SAPS router outputs feeding the monitor router are identified. In step 1522, the monitor router inputs corresponding to the trouble wall where the channel was selected are identified. The outputs feeding the multi-viewer that feeds the defined thread view slot on the trouble wall are also identified. In step 1524, the HD SAPS router is commanded to switch the inputs to the outputs to feed the monitor router. In step 1526, the monitor router is commanded to switch the defined inputs to the outputs on the trouble wall.

In step 1528, the IP decoder for the console is identified. In step 1530, the service profile setting for the channel is identified in the CCS. In step 1532, the console IP decoder is configured. In step 1534, the console IP decoder is tuned to the channel using the PID.

In step 1536, the monitor router input corresponding to the IP decoder is identified. In step 1538, the input to the monitor router output to the feed thread slot is commanded. In step 1540, the IRD for the thread slot is identified and tuned. In step 1542, the trouble wall view is monitored.

Figure 26:
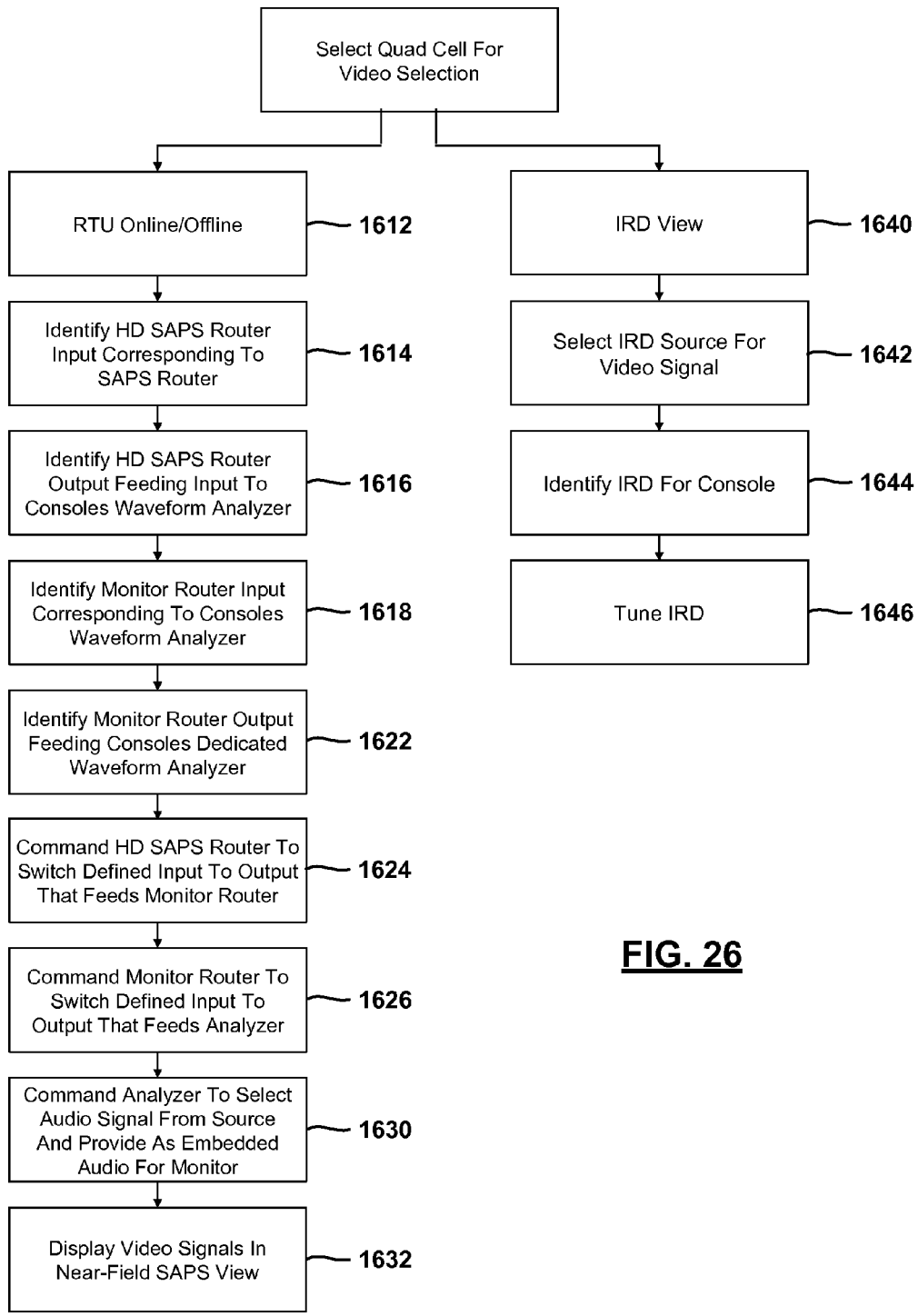
FIG. 26 is a flowchart for a method of forming a near-field SAPS view.

Referring now to FIG. 26, a method for selecting a near-field SAPS view is illustrated. In step 1610, the operator selects the quad cell to provide the video signal. An occasional router, a first SAPS system, and a second SAPS system may be selected to generate an output signal. More than one may be selected to fill the various views on the display. The user may select RTU on-line, RTU off-line or SAPS view. The downlink may also be displayed. If the RTU on-line or off-line is selected in step 1612, the following steps are taken. In step 1614, the HD SAPS router input corresponding to the SAPS source is identified. In step 1616, the HD SAPS router output feeding the input to the console's waveform analyzer is identified. In step 1618, the monitor router input corresponding to the console's waveform analyzer (illustrated as HD scope above) is selected. This may be used to analyze an audio signal. In step 1622, the monitor router output feeding the console's dedicated waveform analyzer is identified. In step 1624, the HD SAPS router is commanded to switch to the defined input to the defined output that feeds the console's dedicated waveform analyzer. In step 1626, the monitor router is commanded to switch to the defined input to the output that feeds the analyzer. In step 1630, the analyzer is commanded to select the audio signal from the source and provide an embedded audio for the monitor. In step 1632, the display displays the near-field SAPS view.

Referring back to step 1620, if the IRD view is selected in step 1610, step 1640 is performed. In step 1642, the IRD source for the video signal is selected.

In step 1644, the IRD for the console is identified.

In step 1646, the IRD is tuned and the IRD is displayed. Tuning may take place using the frequency PID viewer or viewer channel and the tuning parameters associated with the tuning channels.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   processing a first channel signal with a first encoder; selecting a second encoder;
   visually previewing a display of the first channel signal encoded through the second encoder while generating a first broadcast signal using the first channel signal encoded through the first encoder;
   redirecting the first channel signal through the second encoder to form a second encoded signal; and
   generating a second broadcast signal with the first channel signal through the second encoder.

2. A method as recited in claim 1 wherein generating the first broadcast signal comprises generating a first uplink signal and uplinking the first uplink signal to a satellite and wherein generating the second broadcast signal comprises generating a second uplink signal and uplinking the second uplink signal to the satellite.

3. A method as recited in claim 2 wherein the first uplink signal comprises a high-definition digital television signal.

4. A method as recited in claim 2 wherein the first channel signal corresponds to a single program transport signal.

5. A method as recited in claim 1 wherein the first encoder and the second encoder comprise an IP encoder.

6. A method as recited in claim 1 wherein after redirecting the first channel signal through the second encoder to form a second encoded signal, communicating the second encoded signal through a local area network.

7. A method as recited in claim 1 wherein after redirecting the first channel signal through the second encoder to form a second encoded signal, communicating the second encoded signal through a local area network to an uplink signal processing system.

8. A method as recited in claim 1 wherein after redirecting the first channel signal through the second encoder to form a second encoded signal, communicating the second encoded signal through a local area network to a multiplexer of an uplink signal processing system.

9. A method as recited in claim 1 wherein after redirecting the first channel signal through the second encoder to form a second encoded signal, communicating the second encoded signal through a local area network to a primary multiplexer and a secondary multiplexer of an uplink signal processing system.

10. A method as recited in claim 1 wherein redirecting the first channel signal through the second encoder to form a second encoded signal comprises routing the first channel signal to the second encoder using a router.

11. A method comprising:
    processing a first channel signal with a first encoder, said channel signal having a channel service profile;
    selecting a second encoder;
    copying the channel service profile to a monitoring service profile of a monitoring system;
    visually previewing a display of the first channel signal through the second encoder to form a second encoded signal while generating a first broadcast signal using the first channel signal through the first encoder;
    redirecting the first channel signal through the second encoder; and
    generating a second broadcast signal with the first channel signal through the first encoder.

12. A method as recited in claim 11 wherein generating the first broadcast signal comprises generating a first uplink signal and uplinking the first uplink signal to a satellite and wherein generating the second broadcast signal comprises generating a second uplink signal and uplinking the second uplink signal to the satellite.

13. A method as recited in claim 12 wherein the first uplink and the second uplink signal comprise a high-definition digital television signal.

14. A method as recited in claim 11 wherein the first channel signal corresponds to a single program transponder signal.

15. A method as recited in claim 11 wherein the first encoder and the second encoder comprise an IP encoder.

16. A method as recited in claim 11 wherein after redirecting the first channel signal through the second encoder, communicating the second encoded signal through a local area network to an uplink signal processing system.

17. A method as recited in claim 11 wherein after redirecting the first channel signal through the second encoder, communicating the second encoded signal through a local area network to a multiplexer of an uplink signal processing system.

18. A method as recited in claim 11 wherein redirecting the first channel signal through the second encoder comprises routing the first channel signal to the second encoder using a router.

19. A system comprising:
    a first encoder processing a first channel signal to form a first encoded signal;
    a second encoder;

an uplink signal processing system generating a first uplink signal from the first encoded signal;

a monitoring system visually previewing a display of the first channel signal encoded through the second encoder while the uplink signal processing system generates a first broadcast signal using the first channel signal encoded through the first encoder, said monitoring system redirecting the first channel signal through the second encoder to form a second encoded signal; and said uplink signal processing signal generating a second broadcast signal with the first channel signal through the second encoder.

20. A system as recited in claim 19 further comprising a satellite and wherein first broadcast signal comprises a first uplink signal and the second broadcast signal comprises a second uplink signal.

21. A system as recited in claim 20 wherein the first uplink signal and the second uplink signal comprise a digital television signal.

22. A system as recited in claim 19 wherein the first channel signal corresponds to a single program transport signal.

23. A system as recited in claim 19 wherein the first encoder and the second encoder comprise an IP encoder.

24. A system as recited in claim 19 further comprising a local area network communicating the second encoded signal to the uplink signal processing system.

25. A system as recited in claim 19 further comprising a router, said monitoring system redirecting the first channel signal to the second encoder through the router.

\* \* \* \* \*